(12) United States Patent  
Uesato

(10) Patent No.: US 8,400,350 B2  
(45) Date of Patent: Mar. 19, 2013

(54) RADAR DEVICE AND AZIMUTH ANGLE DETECTION METHOD

(75) Inventor: Yoshihide Uesato, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 421 days.

(21) Appl. No.: 12/452,583

(22) PCT Filed: Aug. 7, 2008

(86) PCT No.: PCT/JP2008/002155  
§ 371 (c)(1),  
(2), (4) Date: Jan. 11, 2010

(87) PCT Pub. No.: WO2009/019881  
PCT Pub. Date: Feb. 12, 2009

(65) Prior Publication Data  
US 2010/0134344 A1 Jun. 3, 2010

(30) Foreign Application Priority Data  
Aug. 8, 2007 (JP) ................................. 2007-206472

(51) Int. Cl.  
*G01S 13/06* (2006.01)  
*G01S 13/00* (2006.01)  
*G01S 13/93* (2006.01)

(52) U.S. Cl. ............ 342/156; 342/27; 342/70; 342/147; 342/158

(58) Field of Classification Search .................. 342/118, 342/146–162, 175, 192–197, 13–20, 29, 342/30, 42, 70–72, 89, 91–93, 126, 127, 342/350, 385, 417, 418, 422–424, 428, 430, 342/432, 442, 443, 27, 28; 708/100, 200, 708/446; 381/92; 367/118, 124, 126; 701/300, 701/301; 702/1, 57, 66, 71, 72, 127, 189  
See application file for complete search history.

(56) References Cited

U.S. PATENT DOCUMENTS  
(Continued)

FOREIGN PATENT DOCUMENTS  
JP A-2000-090307 3/2000  
JP A-2000-230974 8/2000  
(Continued)

OTHER PUBLICATIONS

International Search Report issued in International Application No. PCT/JP2008/002155; Mailed on Sep. 2, 2008.

(Continued)

*Primary Examiner* — Bernarr Gregory  
(74) *Attorney, Agent, or Firm* — Oliff & Berridge, PLC

(57) ABSTRACT

An electronic scanning radar device that detects an azimuth angle of a target based on a phase difference between a first pair of received waves received by a first pair of antennas separated by a prescribed distance, and combines the first pair of received waves and generates a first composite wave. The composite wave has a steep antenna pattern, for which the amount of level change is large for the amount of change in azimuth angle, and an azimuth angle judgment unit performs true/false judgment in which a detected azimuth angle is judged to be true when the level of the above first composite wave is equal to or above a reference value, and the azimuth angle is judged to be false when the level is below the reference value.

4 Claims, 17 Drawing Sheets

U.S. PATENT DOCUMENTS

| | | | | |
|---|---|---|---|---|
| 4,019,184 A * | 4/1977 | Dorey | | 342/418 |
| 4,110,754 A * | 8/1978 | Endo | | 342/147 |
| 4,156,240 A * | 5/1979 | Strauch | | 342/156 |
| 4,170,774 A * | 10/1979 | Schaefer | | 342/156 |
| 4,204,655 A * | 5/1980 | Gulick et al. | | 342/424 |
| 4,486,757 A * | 12/1984 | Ghose et al. | | 342/443 |
| 4,717,916 A * | 1/1988 | Adams et al. | | 342/156 |
| 4,746,924 A * | 5/1988 | Lightfoot | | 342/159 |
| 4,845,502 A * | 7/1989 | Carr et al. | | 342/430 |
| 4,876,549 A * | 10/1989 | Masheff | | 342/195 |
| 4,978,963 A * | 12/1990 | Thorpe | | 342/442 |
| 5,008,844 A * | 4/1991 | Kyriakos et al. | | 701/301 |
| 5,227,803 A * | 7/1993 | O'Connor et al. | | 342/442 |
| 5,285,209 A * | 2/1994 | Sharpin et al. | | 342/13 |
| 5,402,129 A * | 3/1995 | Gellner et al. | | 342/70 |
| 5,457,466 A * | 10/1995 | Rose | | 342/442 |
| 5,541,608 A * | 7/1996 | Murphy et al. | | 342/442 |
| 5,552,788 A * | 9/1996 | Ryan et al. | | 342/30 |
| 5,608,411 A * | 3/1997 | Rose | | 342/442 |
| 5,648,767 A * | 7/1997 | O'Connor et al. | | 342/42 |
| 5,724,047 A * | 3/1998 | Lioio et al. | | 342/442 |
| RE36,819 E * | 8/2000 | Gellner et al. | | 342/70 |
| 6,239,747 B1 * | 5/2001 | Kaminski | | 342/147 |
| 6,275,180 B1 * | 8/2001 | Dean et al. | | 342/70 |
| 6,297,762 B1 * | 10/2001 | Labitt | | 342/14 |
| 6,313,794 B1 * | 11/2001 | Rose | | 342/442 |
| 6,476,756 B2 * | 11/2002 | Landt | | 342/42 |
| 6,600,443 B2 * | 7/2003 | Landt | | 342/42 |
| 6,885,333 B2 * | 4/2005 | Sparrow et al. | | 342/13 |
| 7,173,561 B2 | 2/2007 | Isaji | | |
| 7,394,422 B2 * | 7/2008 | Nohmi | | 342/156 |
| 7,415,372 B2 * | 8/2008 | Taenzer et al. | | 702/72 |
| 7,436,188 B2 * | 10/2008 | Taenzer | | 702/189 |
| 7,436,348 B2 * | 10/2008 | Nohmi | | 342/159 |
| 7,472,041 B2 * | 12/2008 | Taenzer et al. | | 702/189 |
| 7,619,563 B2 * | 11/2009 | Taenzer | | 342/442 |
| 7,788,066 B2 * | 8/2010 | Taenzer et al. | | 367/126 |
| 2004/0160364 A1 * | 8/2004 | Regev | | 342/432 |
| 2006/0114146 A1 * | 6/2006 | Lindenmeier et al. | | 342/126 |
| 2007/0047743 A1 * | 3/2007 | Taenzer et al. | | 381/92 |
| 2007/0050441 A1 * | 3/2007 | Taenzer et al. | | 708/446 |

FOREIGN PATENT DOCUMENTS

| | | |
|---|---|---|
| JP | A-2004-170371 | 6/2004 |
| JP | A-2004-198189 | 7/2004 |
| JP | A-2005-003393 | 1/2005 |
| JP | A-2005-172768 | 6/2005 |
| JP | A-2006-329671 | 12/2006 |
| WO | WO 99/34234 A1 | 7/1999 |

OTHER PUBLICATIONS

Mar. 1, 2012 Office Action issued in Chinese Application No. 2008801023855 (with translation), (Document from PRC, not Republic of China).

Sep. 4, 2012 Office Action issued in Japanese Patent Application No. 2009-526343 (Partial English translation only).

Dec. 26, 2012 Office Action issued in Chinese Patent Application No. 200880102385.5 (with English translation), People's Republic of China, Partial Translation.

* cited by examiner

|  | ANTENNA | | |
| --- | --- | --- | --- |
|  | 11 | 12 | 13 |
| COMPOSITE WAVE B1 | ON | ON | OFF |
| COMPOSITE WAVE B2 | OFF | ON | ON |

|  | ANTENNA | | |
| --- | --- | --- | --- |
|  | 11 | 12 | 13 |
| COMPOSITE WAVE B11 | ON | ON | OFF |
| COMPOSITE WAVE B12 | OFF | ON | ON |

FIG.15A
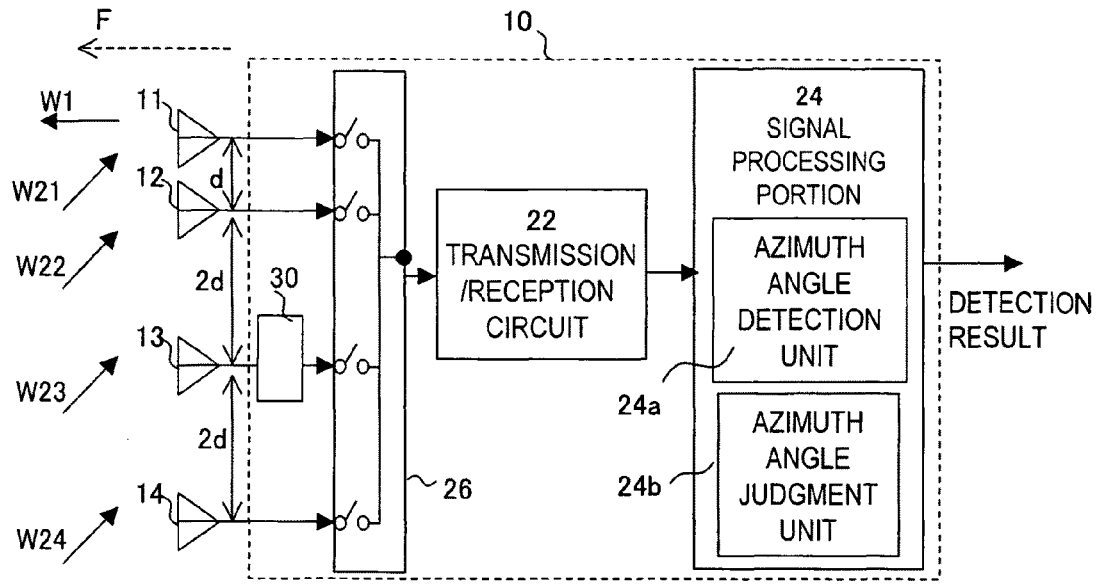
FIG.15B
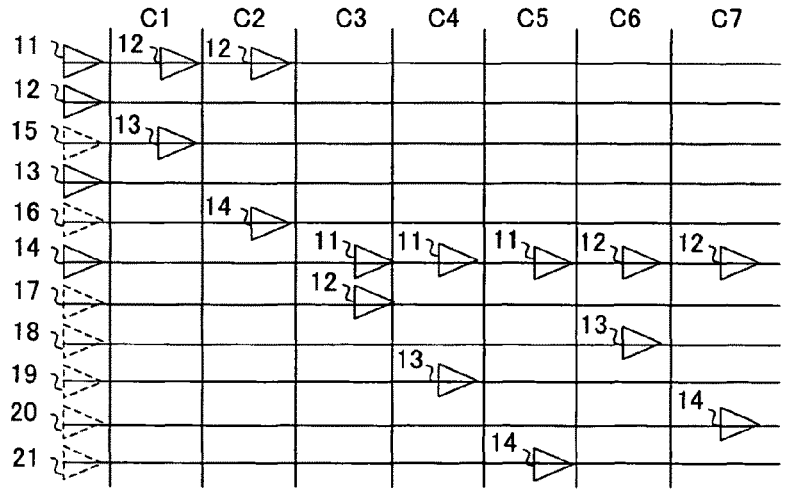
FIG.15C
|  | ANTENNA | | | |
| --- | --- | --- | --- | --- |
|  | 11 | 12 | 13 | 14 |
| COMPOSITE WAVE B3 | ON | ON | OFF | OFF |
| COMPOSITE WAVE B6 | OFF | ON | ON | OFF |
| COMPOSITE WAVE B7 | OFF | OFF | ON | ON |

RADAR DEVICE AND AZIMUTH ANGLE DETECTION METHOD

TECHNICAL FIELD

This invention relates to a radar device and azimuth angle detection method, by which radar waves are transmitted in a reference direction, the radar waves reflected by a target are received as received waves, and the azimuth angle of the target relative to the reference direction is detected, and in particular relates to a radar device and azimuth angle detection method by which the azimuth angle is detected based on the phase difference of received wave pairs received by antenna pairs separated by a prescribed distance.

BACKGROUND

Vehicle control systems are known which perform collision avoidance control, in which the vicinity of a traveling vehicle is scanned by a vehicle radar device, and when collision with an obstruction is predicted, the vehicle is accelerated/decelerated or a safety device is activated. As a vehicle radar device used in such a system, electronic scanning type radar devices are known. As disclosed in an example in Patent Reference 1, an electronic scanning type radar device uses a plurality of antennas to receive radar waves reflected by a target, and based on the phase difference of the received waves of the antennas, detects the arrival direction of the received waves, that is, the azimuth angle of the target.

FIG. 1A and FIG. 1B explain the principle of detection of the azimuth angle of a target by an electronic scanning type radar device. As shown in FIG. 1A and FIG. 1B, an electronic scanning type radar device 10 transmits a radar wave W1 with the radar device front face as the reference direction F, and receives the radar wave W1 reflected by the target T using two antennas 11, 12 as the received waves W21, W22. Here, the distance d between the antennas 11 and 12 is minute compared with the distance to the target T, so that the transmission paths of the received wave W21 received by the antenna 11 and of the received wave W22 received by the antenna 12 can be regarded as parallel. And, the arrival direction of the received waves W21 and W22, that is, the azimuth angle of the target T with respect to the reference direction F (azimuth angle 0°), is θ.

First, as shown in FIG. 1A, when the azimuth angle θ of the target T is 0°, that is, when the received wave pair W21, W22 arrive from the reference direction F, the pair of received waves W21, W22 arrive simultaneously at the antenna pair 11, 12. At this time, the pair of received waves W21, W22 have the same phase. That is, there is no phase difference between these received waves.

Next, as shown in FIG. 1B, when the azimuth angle θ of the target T is shifted to the left from the reference direction F, a difference in the traveling distance of the pair of received waves W21, W22 of $\Delta d$ ($=d \cdot \sin \theta$) occurs which is proportional to the antenna distance d. Hence the time of arrival of the received wave W22 at the antenna 12 is delayed from the time of arrival of the received wave W21 at antenna 11 by the amount equivalent to the difference in traveling distances $\Delta d$. At this time, if the wavelength of the received waves W21 and W22 is λ, then a phase difference $\phi (=\Delta d \cdot 2\pi/\lambda)$ occurs, corresponding to the delay time between the pair of received waves W21 and W22. This applies in cases in which the azimuth angle θ of the target T is shifted to the right of the reference direction as well.

In this way, from the phase difference φ between the pair of received waves W21 and W22, the azimuth angle θ of the target T can be determined from expression (1) below.

$$\theta = \arcsin(\lambda \cdot \phi/(2\pi \cdot d)) \quad (1)$$

Here, if the phase difference φ between the received waves exceeds ±π, that is, if so-called phase wrapping occurs, then as indicated in expression (2) below, θ cannot be uniquely determined from the phase difference φ.

$$\theta = \arcsin(\lambda \cdot (\phi \pm k\pi)/(2\pi \cdot d))(k=0,1,2,\ldots) \quad (2)$$

Hence the range over which the azimuth angle θ is uniquely determined from the phase difference φ is indicated by the following expression (3), taking k=1 in expression (2).

$$-\arcsin(\lambda \cdot \phi/(2d)) \arcsin(\lambda \cdot \phi/(2d)) \quad (3)$$

The relation between the phase difference φ and azimuth angle θ in expression (3) is represented by the straight line L in FIG. 2A. That is, in the range $\pm \arcsin(\lambda \cdot \phi/(2d))$, the azimuth angle θ1 is uniquely determined from the phase difference φ1. In the following, the range of azimuth angles in which the azimuth angle θ is uniquely determined from the phase difference φ in this way is called the phase wrapping interval (A1), and the azimuth angle $-\arcsin(\lambda \cdot \phi)/(2d)$ and $+\arcsin(\lambda \cdot \phi/(2d))$ at which phase wrapping occurs are represented by θa and θb respectively.

Hence in ranges outside the phase wrapping interval A1, for example the phase difference φ2 corresponds to a plurality of azimuth angles, that is, to an azimuth angle θ21 outside the phase wrapping interval A1, and an azimuth angle θ22 within the phase wrapping interval A1.

FIG. 2B shows the azimuth angle of a target T in the scanning plane of the radar device 10. If the phase difference of a pair of received waves from the target existing at azimuth angle θ21 is φ2, then according to the correspondence relation of FIG. 2A, the azimuth angles θ21 and θ22 are obtained. Operations of a vehicle are controlled with respect to targets existing in the azimuth angle range in which dangers due to collision or other factors are great. The range of these azimuth angles is taken to be a phase wrapping interval A1. Then, assuming that a target T actually existing at the azimuth angle θ21 also exists at the azimuth angle θ22, by making an erroneous detection (indicated by the dotted line in the figure), vehicle operation is controlled with respect to a target which does not actually exist. As a result, a hindrance to safety occurs.

Hence in order to prevent hindrances with erroneous detection, various methods have been proposed in the past. One example is a method in which, after determining the azimuth angle from the phase difference between a pair of received waves as described above, radar waves are again transmitted and received, and the levels of the newly received waves are used to make a true/false judgment of the azimuth angle previously determined. Specifically, in this method, for an azimuth angle θ22 detected within the phase wrapping interval A1, judgment is performed as to whether a target actually exists (true) or does not (false) at the azimuth angle in question. FIG. 3A and FIG. 3B explain this method.

In FIG. 3A, the azimuth angle is plotted along the horizontal axis, and the vertical axis plots the level of waves received by an antenna 11 obtained by reflection from a target when the same target, such as for example a passenger vehicle or other small vehicle exists at all azimuth angles. The received wave level is maximum in the reference direction F, that is, for a target existing at azimuth angle 0°. And, as the azimuth angle shifts from 0°, the level of the received wave obtained from the target existing at that azimuth angle declines. That is, the level of the wave received by the antenna 11 is maximum when the arrival direction of the received wave is azimuth angle 0°, and drops as the arrival angle approaches azimuth angles of ±90°. In other words, an antenna pattern P1 having directivity at azimuth angle 0° is described. This applies also to an antenna 12 with the same configuration as the antenna 11.

Next, the phase wrapping interval A1 shown in FIG. 2A is applied to this antenna pattern P1, and the reception level T1 obtained at the end portions of the interval, that is, at the azimuth angles θa and θb, is taken to be the threshold value for true/false judgment. When the level of a wave received by the antenna 11 exceeds the threshold value T1, the received wave is from a target existing within the phase wrapping interval A1. Hence in this case it is possible to infer the existence of an actual target within the phase wrapping interval A1. Conversely, when the level of a received wave does not exceed the threshold value T1, the received wave is from a target existing outside the phase wrapping interval A1, and so it can be inferred that the target does not exist in the phase wrapping interval A1.

Using this fact, the radar device 10 first determines the azimuth angle θ22 indicated in FIG. 2B, and then performs radar wave transmission and reception, and compares the level of the wave received by the antenna 11 with the threshold value T1. If the level of the received wave is lower than the threshold value T1, that is, if the target does not exist within the phase wrapping interval A1, the azimuth angle θ22 thus determined can be inferred to be a false azimuth angle arising from phase wrapping. Hence the radar device 10 judges this to be false. In this case, the detection result is not output to the vehicle control device.

When the level is equal to or greater than T1, a target is judged to actually exist at the detected azimuth angle θ22. In this case, in contrast with the case of FIG. 2B, a target actually exists within the phase wrapping interval A1, and the azimuth angle θ22 has been determined from the phase difference in the pair of waves received from the target. Hence the azimuth angle θ22 is judged to be the correct azimuth angle, and the detection result is output.

By making a true/false judgment of a detected azimuth angle based on received wave levels in this way, a radar device 10 can prevent vehicle control based on erroneous detection.
Patent Reference 1: Japanese Patent Application Laid-open No. 2005-3393

However, the levels of waves received at the same azimuth angle differ greatly with the magnitude of the reflection cross-sectional area of the target, and are lower for small reflection cross-sectional areas. In contrast with the antenna pattern P1 obtained from a small vehicle shown in FIG. 3A, FIG. 3B shows the antenna pattern P2 obtained from a truck or other large vehicle, as an example of a case in which the reflection cross-sectional area is large. That is, by displacing the antenna pattern P1 upward, the antenna pattern P2 is obtained.

When making a true/false judgment of the azimuth angle θ22 shown in FIG. 2B, the level of the wave received from the target existing at azimuth angle θ21 is equal to or greater than the threshold value T1. Hence because the received wave level is equal to or greater than the threshold value, the radar device 10 judges the azimuth angle θ22 to be correct. Hence the vehicle operation is controlled with respect to a target which does not actually exist at the azimuth angle θ22, and a hindrance to safety occurs.

SUMMARY

Hence in light of the above, an object of this invention is to provide a radar device and similar which, even when an antenna pattern is displaced according to the reflection cross-sectional area of a target, can accurately make a true/false judgment of a detected azimuth angle, based on received wave levels.

To achieve the above-indicated object, according to a first aspect of the present invention, in a radar device, which transmits radar waves in a reference direction, receives the radar waves reflected by a target as received waves, and detects an azimuth angle of the target relative to the reference direction, an azimuth angle detection unit detects the azimuth angle based on a phase difference between a first pair of received waves received by a first pair of antennas separated by a prescribed distance, a composite wave generation unit combines the first pair of received waves and generates a first composite wave, and an azimuth angle judgment unit which performs true/false judgment in which the detected azimuth angle is judged to be true when the level of the first composite wave at this detected azimuth angle is equal to or greater than a reference value, and the detected azimuth angle is judged to be false when the level is lower than the reference value.

According to a preferable mode of the above aspect, a phase shifter shifts the phase of either received wave among the first pair of received waves, wherein the composite wave generation unit generates a second composite wave from a second pair of received waves comprising a received wave the phase of which has been shifted, and the azimuth angle judgment unit performs true/false judgment in which the detected azimuth angle is judged to be true when the level of either of the first or second composite wave at this detected azimuth angle is equal to or greater than a reference value, and the detected azimuth angle is judged to be false in other cases.

According to the above aspects, a composite wave is used having a steep antenna pattern, and for which the amount of level change is large for the amount of change in azimuth angle, and true/false judgment is performed in which a detected azimuth angle is judged to be true when the level of the above first composite wave is equal to or above a reference value, and the azimuth angle is judged to be false when the level is below the reference value. Hence even when the reflection cross-sectional area of a target is large and the composite wave level is displaced upward, the composite wave of a received wave from a target outside the phase wrapping interval does not exceed the threshold value for true/false judgment. Hence an azimuth angle which is erroneously detected due to phase wrapping is not judged to be true. Consequently, true/false judgments of detected azimuth angles can be performed accurately.

According to the above mode, a phase shifter is further comprised which shifts the phase of one of the received waves of the first pair of received waves, so that the directivity of a second composite wave generated from a second pair of received waves comprising the phase-shifted received wave can be moved, and composite wave levels and a true/false judgment threshold value can be compared over a wide range of azimuth angles. Hence the range of azimuth angles for which true/false judgments are possible can be broadened.

BRIEF DESCRIPTION OF THE DRAWINGS

FIG. 15A to FIG. 15C explain a fourth configuration example of a radar device 10 of this embodiment.

DETAILED DESCRIPTION

Figure 1A:
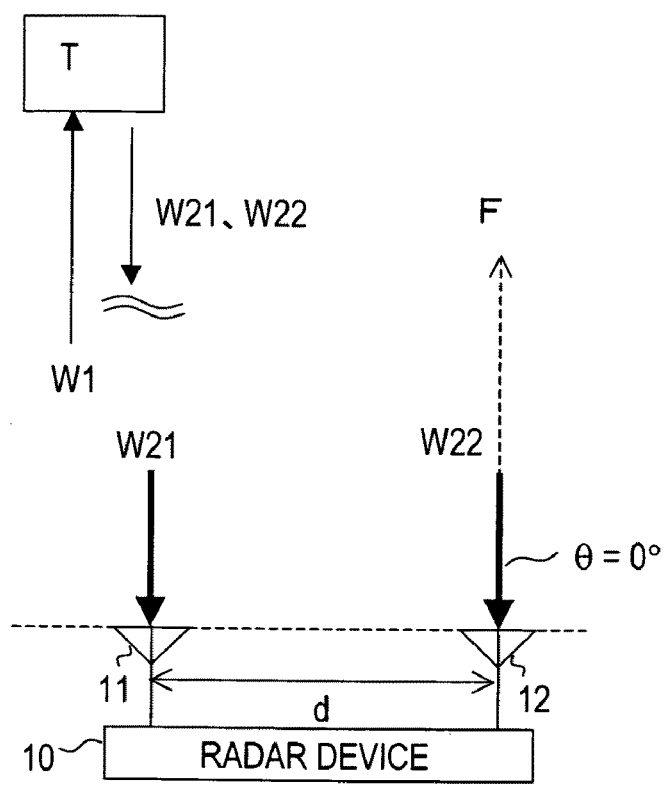
FIG. 1A and FIG. 1B explain the principle of detection of the azimuth angle of a target by an electronic scanning type radar device.
Figure 1B:
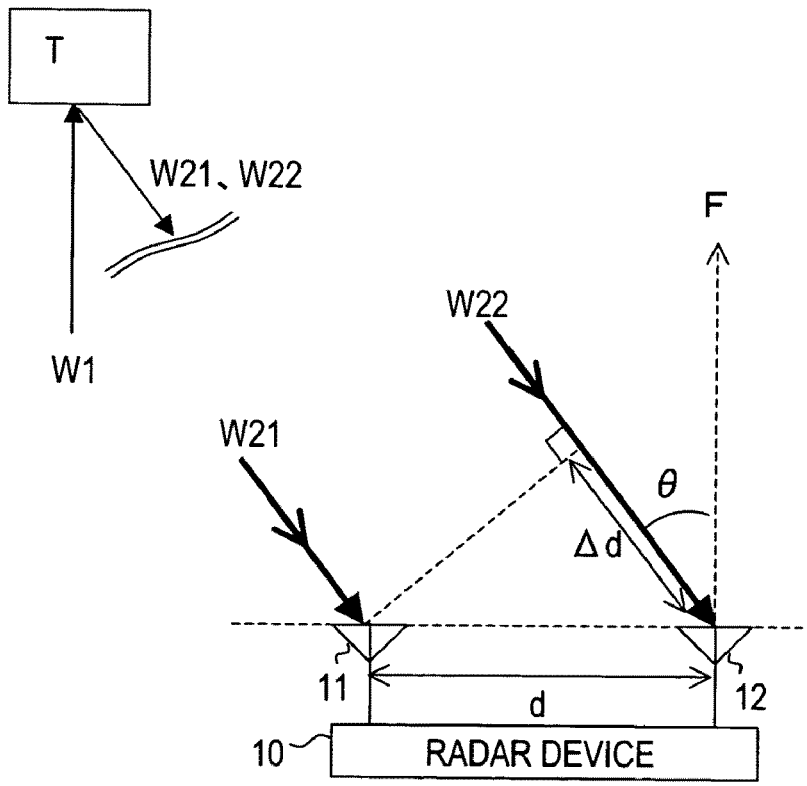

Below, an aspect of the invention is explained referring to the drawings. However, the technical scope of the invention is not limited to this aspect, but extends to the inventions described in the Scope of Claims, and to inventions equivalent thereto.

Figure 4:
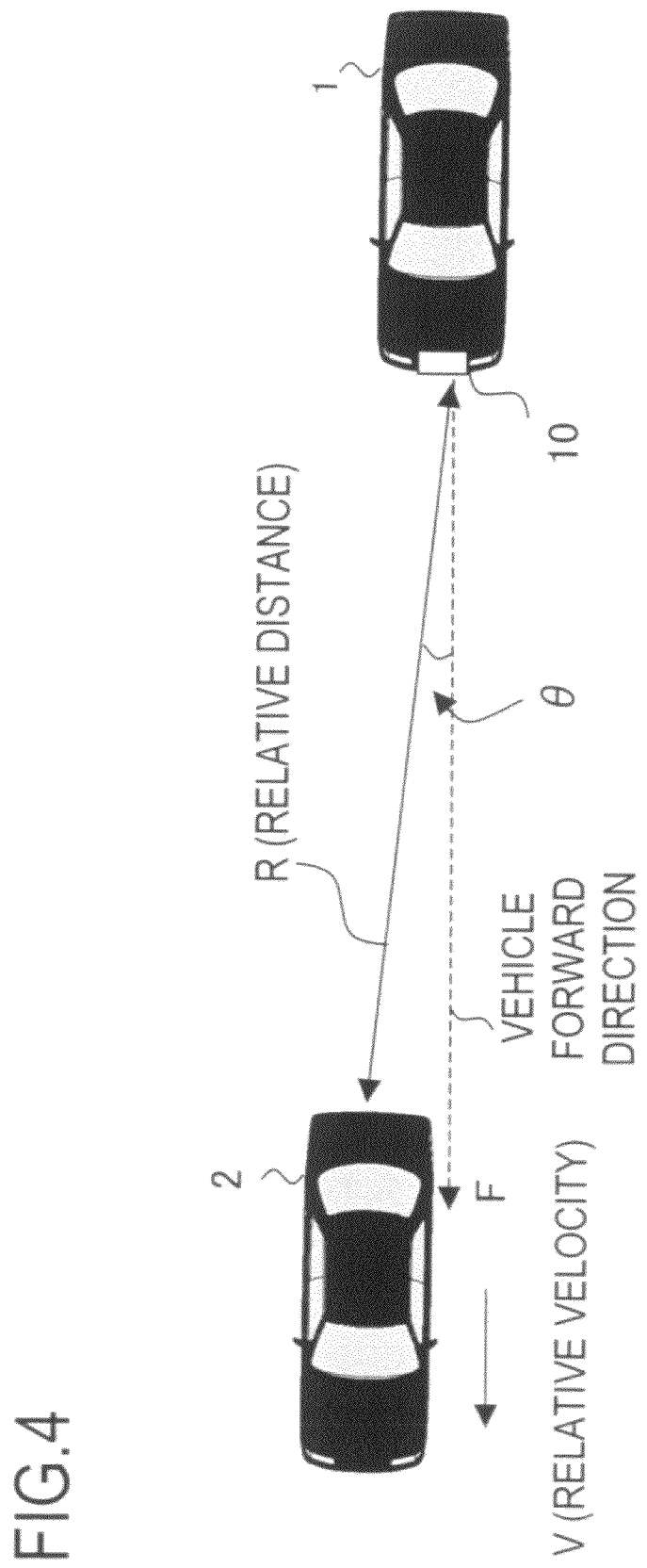
FIG. 4 shows an example of a vehicle in which a radar device of this embodiment is installed.

FIG. 4 shows an example of a vehicle in which a radar device of this embodiment is installed. The electronic scanning type radar device 10 is installed in the front grille in the front portion of the vehicle 1, transmits radar waves with the vehicle forward direction as the reference direction F, and uses a plurality of antennas to receive radar waves reflected by a preceding vehicle 2 or other target. And, based on the phase difference in received waves among the antennas, the radar device 10 detects the arrival direction of the received waves, that is, the azimuth angle θ of the target relative to the center-forward direction of the vehicle 1 itself.

Further, the radar device 10 uses as the transmission wave a continuous wave with periodically repeating rising-frequency intervals and falling-frequency intervals, in which rising-frequency intervals the frequency rises and in which falling-frequency intervals the frequency falls, to detect the relative distance R and relative velocity V of the preceding vehicle 2 from the frequency difference of transmitted and received waves. And, based on these detection results, a control device, not shown, of the vehicle 1 controls operation of the vehicle 1 so as to travel following the vehicle 2 and so as to avoid rear-end collisions.

Figure 5:
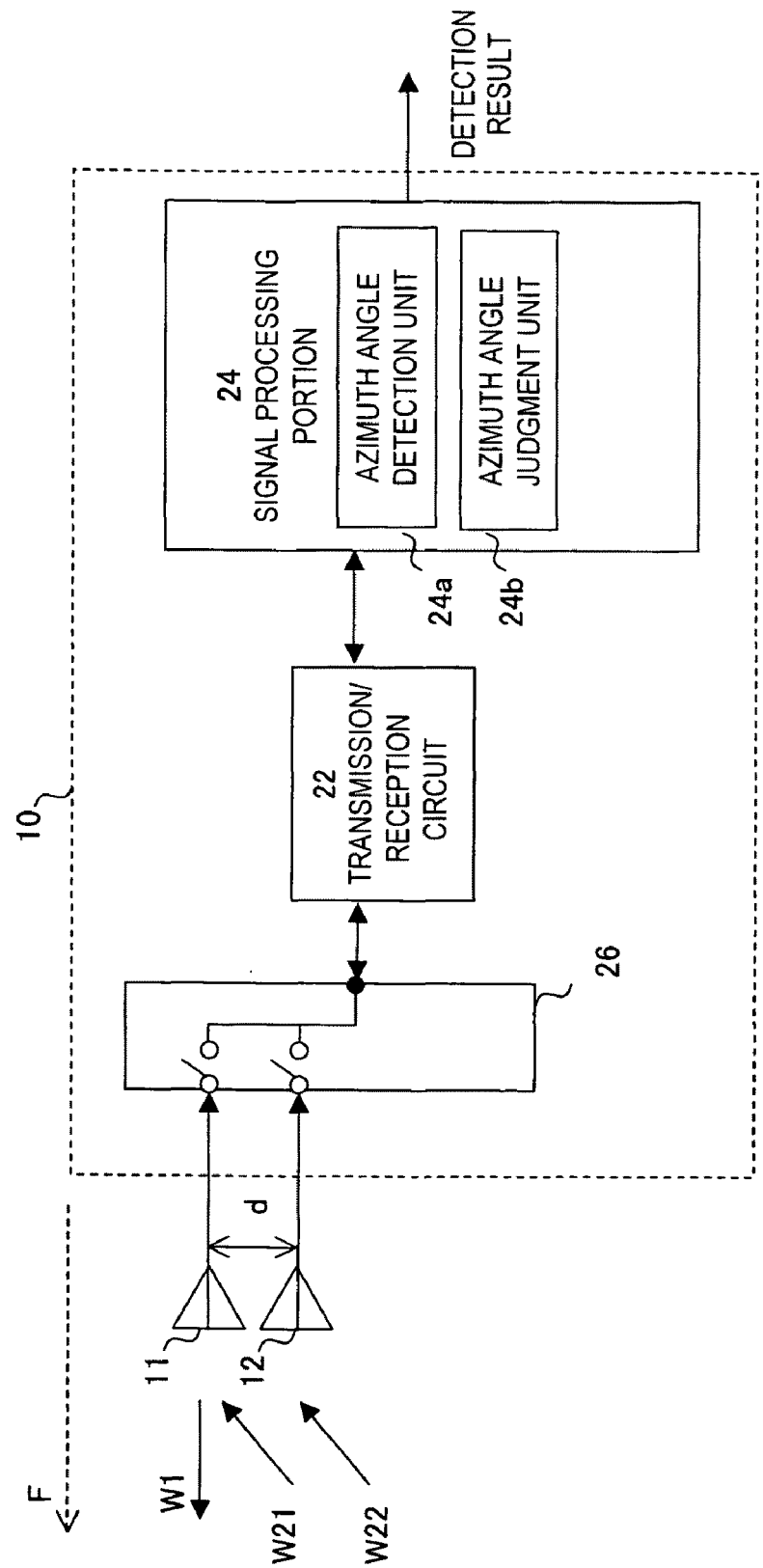
FIG. 5 shows a first configuration example of the radar device 10 of this embodiment.

FIG. 5 shows a first configuration example of the radar device 10 of this embodiment. A transmission wave W1, generated by a transmission/reception circuit 22 comprising an application-specific integrated circuit or similar, is transmitted along the reference direction F by an antenna 11 which is used for both transmission and reception. The transmission wave, reflected by a target, is received by the pair of antennas 11 and 12. Here, the antenna 11 and antenna 12 are positioned separated by a distance d in the direction perpendicular to the reference direction F. Hence a phase difference φ occurs between the wave W21 received by the antenna 11 and the wave W22 received by the antenna 12, according to the arrival direction of the received waves and the distance d. From this phase difference φ, the arrival direction of the received waves, that is, the azimuth direction θ of the target, is determined in later-stage processing.

The composite wave generation portion 26 comprises a switch connecting the antennas 11 and 12, and combines the pair of received waves W21 and W22 to generate a composite wave.

And, the transmission/reception circuit 22 mixes the composite wave with the transmission wave W1, generates a beat signal corresponding to the frequency difference therebetween, and outputs the result to the signal processing portion 24. The transmission/reception circuit 22 also detects the level of the composite wave of the pair of received waves W21, W22, and outputs the result to the signal processing portion 24. The signal processing portion 24 comprises a microcomputer having, for example, a CPU, ROM storing various processing programs executed by the CPU, and RAM used as a work area by the CPU for various computations.

Figure 2A:
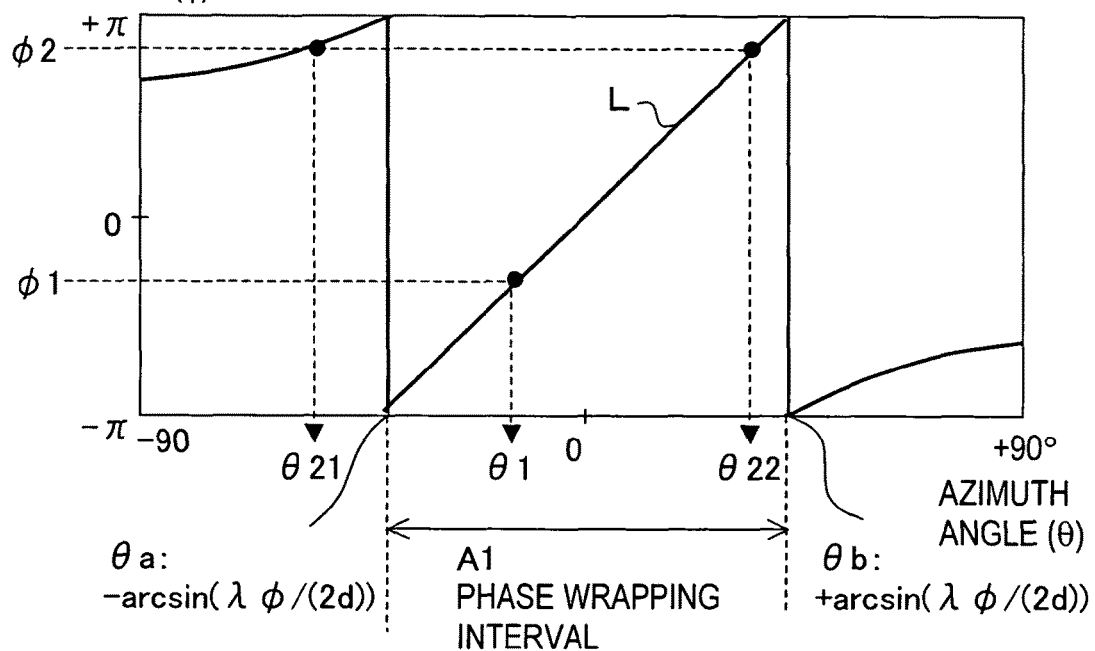
FIG. 2A and FIG. 2B show the relation between the phase difference and azimuth angle.
Figure 6:
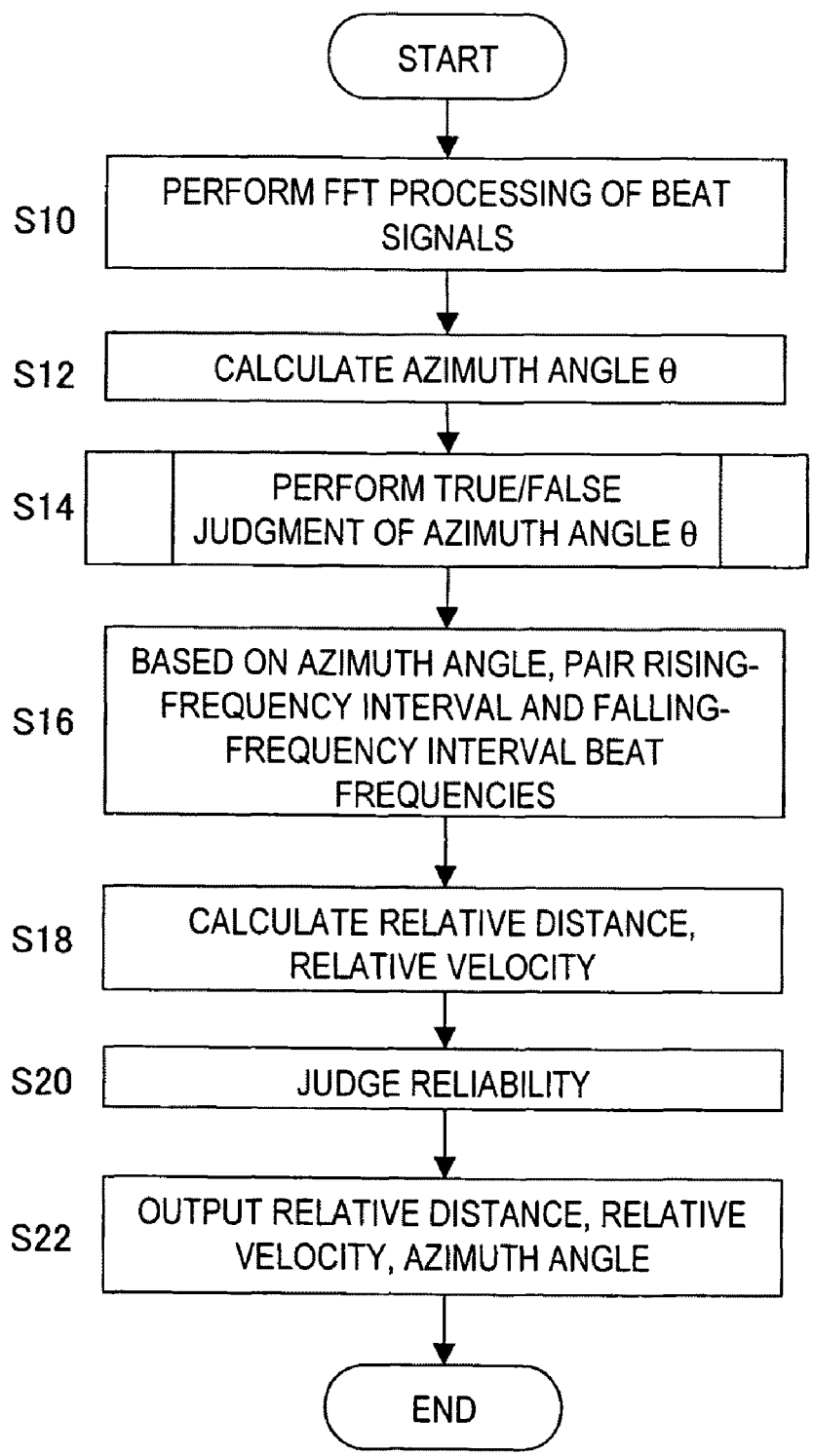
FIG. 6 is a flowchart explaining a procedure for operation of the signal processing portion 24.

FIG. 6 is a flowchart explaining a procedure for operation of the signal processing portion 24. First, the signal processing portion 24 performs FFT (Fast Fourier Transform) processing of the beat signals, and detects the frequency corresponding to the frequency difference between transmission waves and reception waves in the rising-frequency intervals and falling-frequency intervals of the transmission wave, that is, the beat frequency, as well as the phase difference φ between the pair of received waves W21 and W22 (S10). Then, the signal processing portion 24 calculates the azimuth angle θ of the target from the phase difference φ of the received waves (S12). At this time, correspondence relation data between phase differences φ and azimuth angles θ, such as that shown in FIG. 2A, is stored in advance in internal ROM of the signal processing portion 24, and the signal processing portion 24 determines the azimuth angle θ from the phase difference φ based on this data. Hence the signal processing portion 24 which executes the procedure S12 corresponds to the "azimuth angle detection unit" 24a.

And, the signal processing portion 24 performs true/false judgment of the azimuth angle θ thus determined, according to a procedure described in detail below (S14). Hence the signal processing portion 24 which executes the procedure S14 corresponds to the "azimuth angle judgment unit" 24b.

Further, the signal processing portion 24 performs pairing to associate, for an azimuth angle the true/false judgment result of procedure S14 of which is true, the beat frequency of the rising-frequency intervals of the transmission wave and the beat frequency of the falling-frequency intervals (S16), and calculates the relative velocity and relative distance of the target at this azimuth angle (S18). And, the signal processing portion 24 judges the reliability of the detection result based on whether there is continuity of the detection result (S20), and outputs an output result judged to be reliable to the vehicle control device (S22).

Figure 7A:
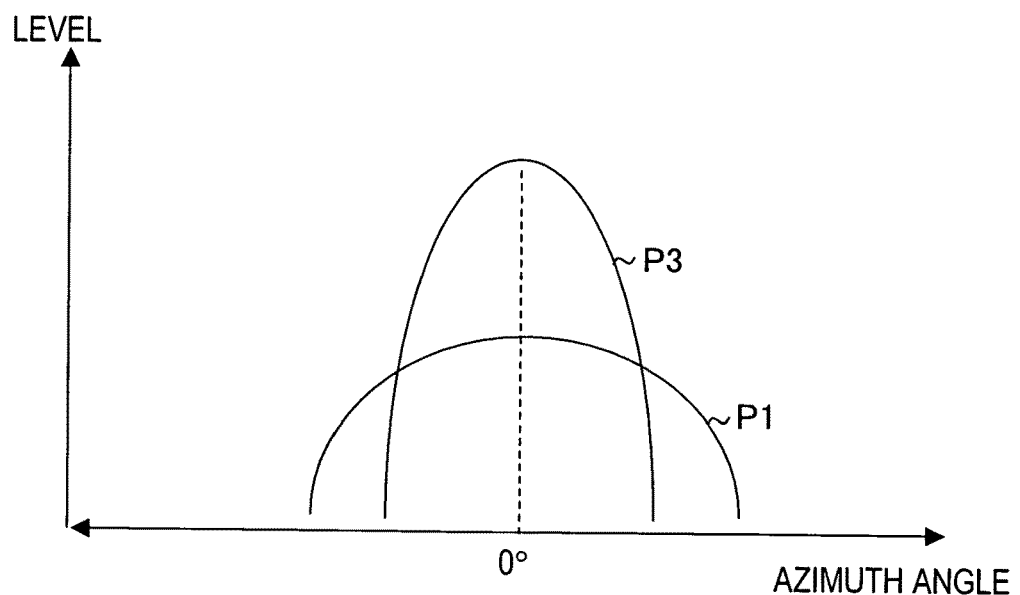
FIG. 7A and FIG. 7B explain composite wave antenna patterns used in true/false judgments in the first configuration example.
Figure 7B:
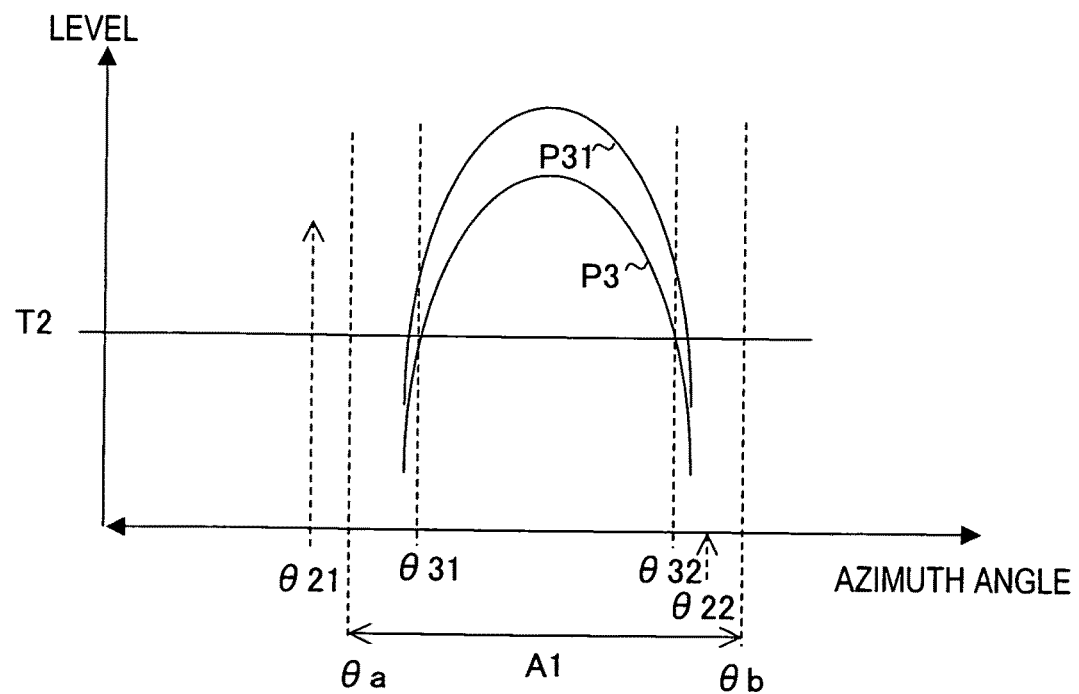
Figure 8:
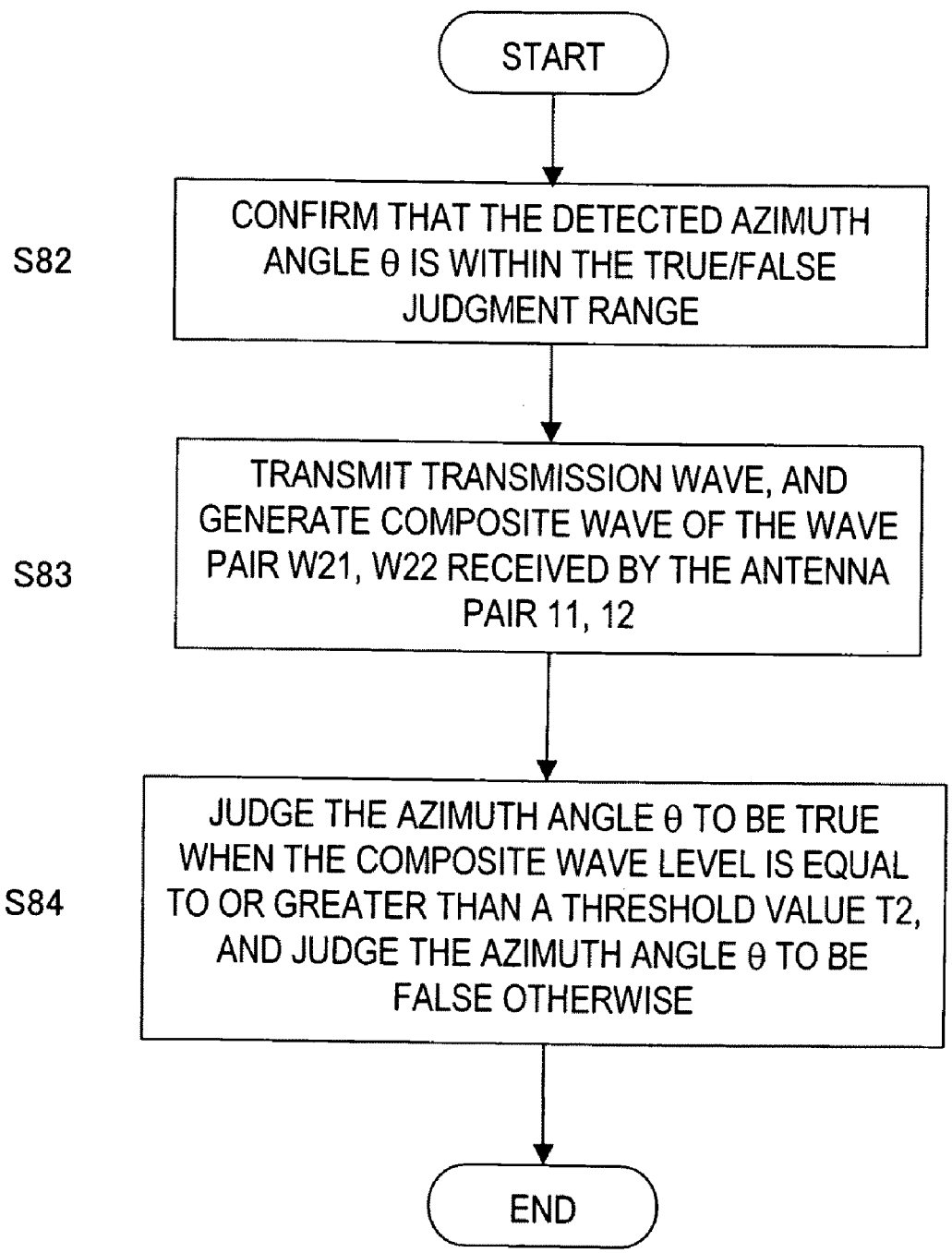
FIG. 8 is a flowchart explaining in detail the true/false judgment procedure for a detected azimuth angle in the first configuration example.

Next, the azimuth angle true/false judgment procedure in procedure S14 is explained using FIG. 7A and FIG. 7B and FIG. 8.

FIG. 7A and FIG. 7B explain composite wave antenna patterns used in true/false judgments in the first configuration example. In FIG. 7A and FIG. 7B, the horizontal axis indicates the azimuth angle, and the vertical axis indicates the level of the received wave W21 or W22, or the level of the composite wave of the pair of received waves W21, W22.

Figure 3A:
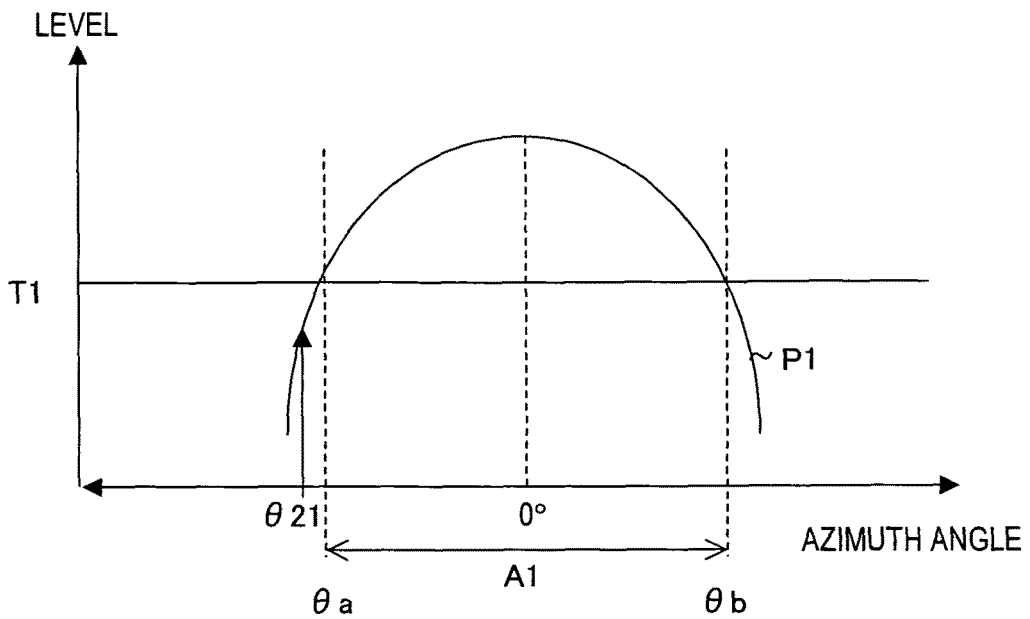
FIG. 3A and FIG. 3B explain the method for true/false judgment for a detected azimuth angle basing upon the level of the received wave.
Figure 3B:
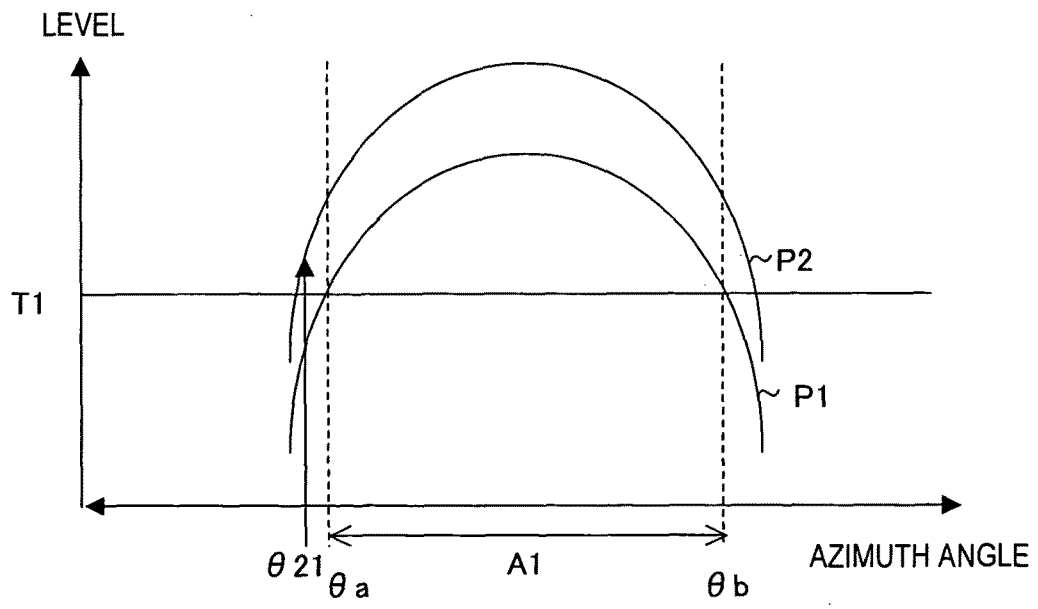

First, as shown in FIG. 7A, when a target (small vehicle) is posited at all azimuth angles, the level of the received wave W21 or W22 from a target at each azimuth angle is indicated by the antenna pattern P1 for the single antenna 11 (or antenna 12) as shown in FIG. 3A. Next, the level of the composite wave at all azimuth angles is indicated by the antenna pattern P3. In the antenna pattern P3, the received waves W21 and W22 are in the same phase at azimuth angle 0°, so that the received level corresponding to the composite amplitude is maximum. And, as the azimuth angle moves from 0° to approach ±90°, the phase difference between the received waves W21 and W22 increases, so that the level corresponding to the composite amplitude decreases rapidly. Here, comparing the antenna patterns P1 and P3, the amount of change in the level with the amount of displacement of the azimuth angle is steeper for the antenna pattern P3.

Next, as shown in FIG. 7B, in the first configuration example an arbitrary level T2 of the composite wave is taken to be the threshold value for true/false judgment. And, azimuth angles at which the composite wave level is T2 are taken to be $\theta 31$ and $\theta 32$. Then, when the composite wave level is equal to or greater than the threshold value T2, it can be judged that the pair of received waves W21, W22 were obtained from a target existing within the range of azimuth angles $\theta 31$ to $\theta 32$. Conversely, when the composite wave level is less than the threshold value T2, it can be judged that the received waves were obtained from a target existing outside the range of azimuth angles $\theta 31$ to $\theta 32$.

Utilizing the above, the signal processing portion 24 determines the azimuth angle $\theta$ in procedure S12, and thereafter compares the level of the composite wave with the threshold value T2 in procedure S14 to make a judgment as to whether the target actually exists in the range of azimuth angles from $\theta 31$ to $\theta 32$. That is, when the azimuth angle $\theta$ thus determined is in the range of azimuth angles from $\theta 31$ to $\theta 32$, if the level of the composite wave is equal to or greater than the threshold value T2, the azimuth angle $\theta$ is judged to be true. If on the other hand the level is below the threshold value T2, the azimuth angle is outside the range of azimuth angles from $\theta 31$ to $\theta 32$, so that the pair of received waves was received from a target existing outside the phase wrapping interval A1, and the azimuth angle thus determined arose from wrapping of the phase difference of the received wave pair, and so is judged to be false. In the following, the azimuth angle range in which such true/false judgments are possible (in the above example, azimuth angles from $\theta 31$ to $\theta 32$) is called the true/false judgment range.

Figure 2B:
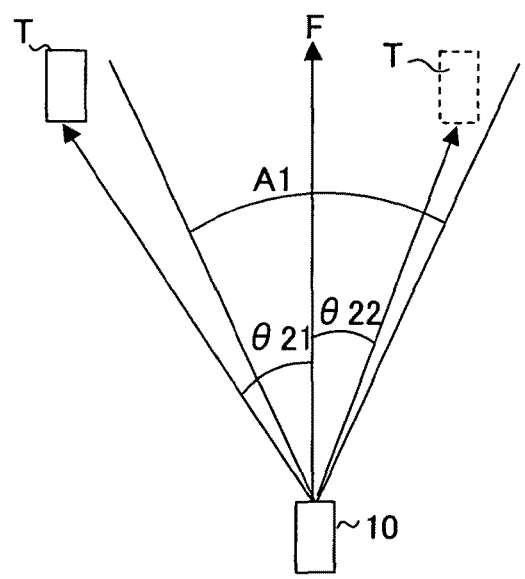

Here, when the cross-sectional area of the target is large, the level of the received wave W21 or W22 is higher. Hence the level of the composite wave is correspondingly larger, so that the antenna pattern P3 is displaced upward, similarly to P31. However, in the antenna patterns P3 and P31, the amount of change in level for a change in the azimuth angle is larger than for the antenna pattern P1 of a single antenna, and a steep curve is described. Hence as shown in FIG. 2B, even when a target existing at the azimuth angle $\theta 21$ outside the phase wrapping interval A1 is a large vehicle, and a pair of waves is received from this target, due to displacement of the antenna pattern P3 to P31, the level of the composite wave at the azimuth angle $\theta 21$ is not equal to or greater than the threshold value T2. That is, the azimuth angle $\theta 22$ being judged to be true despite the fact that a target does not actually exist at the azimuth angle $\theta 22$ can be prevented. Hence erroneous true/false judgments arising from received waves from a target existing at an azimuth angle outside the phase wrapping interval A1 can be prevented.

FIG. 8 is a flowchart explaining in detail the true/false judgment procedure for a detected azimuth angle in the first configuration example. The procedure of FIG. 8 corresponds to procedure S14 in FIG. 6.

The signal processing portion 24 first judges whether a detected azimuth angle $\theta$ is within the true/false judgment range ($\theta 31$ to $\theta 32$) (S82). If the detected azimuth angle $\theta$ is in the true/false judgment range, the signal processing portion 24 instructs the transmission/reception circuit 22 to transmit a transmission wave, and instructs the composite wave generation portion 26, via the transmission/reception circuit 22, to generate a composite of the pair of waves W21, W22 received by the antenna pair 11, 12 (S83).

And, based on whether the level of the composite wave is equal to or greater than the threshold value T2, the signal processing portion 24 performs a true/false judgment of the azimuth angle $\theta$ (S84). At this time, if the level is equal to or greater than the threshold value T2, the detected azimuth angle $\theta$ can be judged to have been detected from waves received from a target which actually exists in the true/false judgment range, so that the detection result is judged to be true. On the other hand, if the composite wave level is less than the threshold value T2, the detected azimuth angle $\theta$ can be judged to have been erroneously detected due to waves received from a target existing outside the phase wrapping interval A1, and so is judged to be false.

However, in the above FIG. 7A and FIG. 7B, the true/false judgment range is limited to the range in which the antenna pattern P2 exceeds the threshold value T2. Next, a configuration example is explained which is suitable for broadening the true/false judgment range.

Figures 9A, 9B:
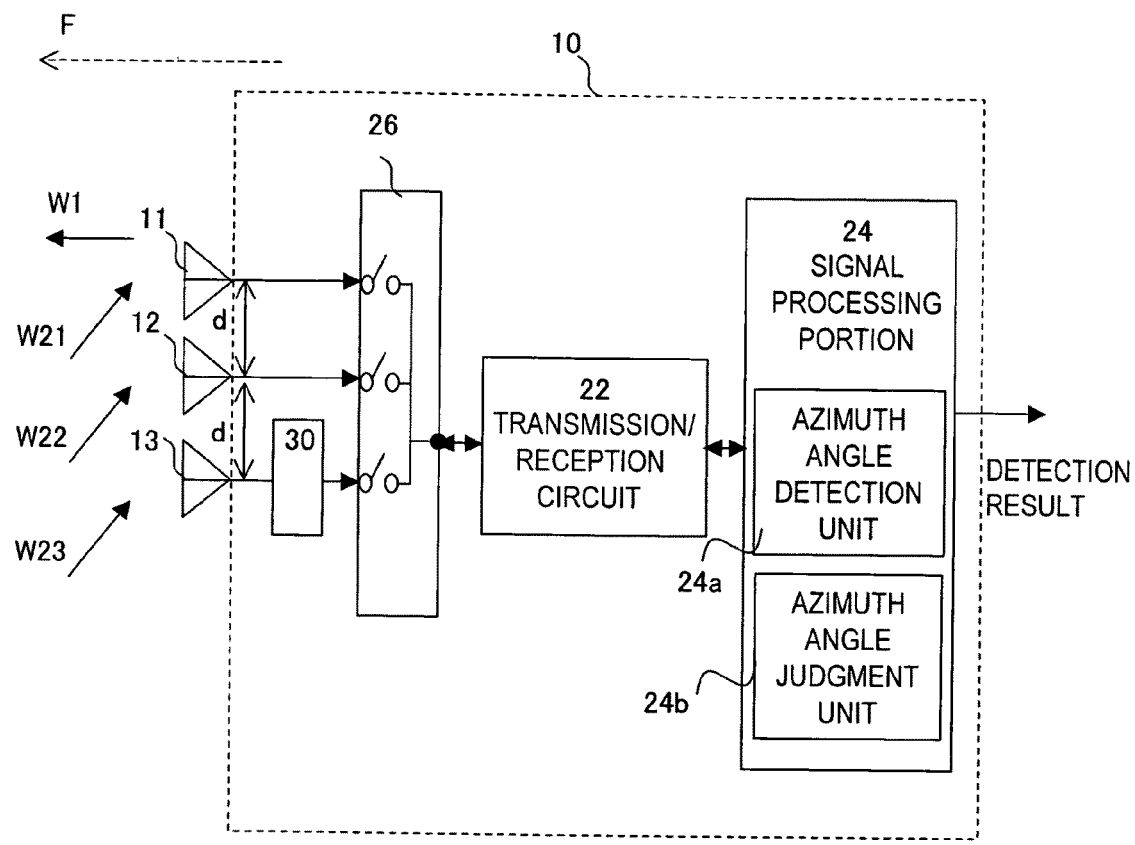
FIG. 9A and FIG. 9B explain a second configuration example of a radar device 10 of this embodiment.

FIG. 9A and FIG. 9B explain a second configuration example of a radar device 10 of this embodiment. Portions differing from the first configuration example are explained. As shown in FIG. 9A, the radar device 10 has, in addition to the first configuration example, an antenna 13. And, the antenna 13 is positioned at a distance d from the antenna 12.

In this configuration, the signal processing portion 24 uses the waves received by the antennas 11, 12, 13 to perform digital beamforming processing, to detect the azimuth angle of the target. The wave received by the antenna 11 is W21, the wave received by the antenna 12 is W22, and the wave received by the antenna 13 is W23.

Further, the wave W23 received by the antenna 13 is input to the phase shifter 30. The phase shifter 30 delays the phase of the received wave W23 and inputs the result to the composite wave generation portion 26.

The composite wave generation portion 26 switches the switches to connect two among the antennas 11, 12, 13, according to the table in FIG. 9B. The pair of waves received by the connected pair of antennas are combined to generate a composite wave. That is, the composite wave generation portion 26 first turns on the switches for the antennas 11 and 12, to combine the pair of received waves W21 and W22 and generate a composite wave B1. Next, the composite wave generation portion 26 turns on the switches for the antennas 12 and 13, to combine the pair of received waves W22 and W23 and generate a composite wave B2.

Figure 10A:
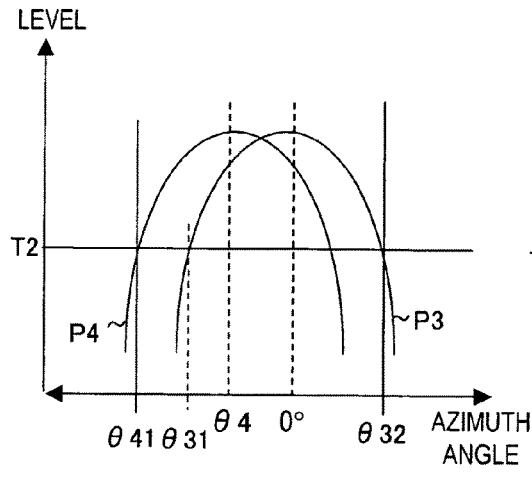
FIG. 10A to FIG. 10D show the antenna patterns for the composite waves in the second configuration example.

As a result, the antenna patterns for the composite waves B1 and B2 are as shown in FIG. 10A to FIG. 10D. First, as shown in FIG. 10A, from the pair of received waves W21 and W22, an antenna pattern P3 is formed which is sharper than for a single antenna 11 (or antenna 12), as explained in the first configuration example.

In the second configuration example, when the composite wave B2 is generated, the phase of the wave W23 received by the antenna 13 is delayed, so that the pair of received waves W22 and W23 have the same phase at an azimuth angle θ4 shifted from azimuth angle 0°. Hence the antenna pattern P4 corresponding to the composite wave B2 is parallel-shifted such that the antenna pattern P3 has directivity at azimuth angle θ4.

Hence in the antenna pattern P3 or P4, the range of azimuth angles at which the reception level is equal to or greater than the threshold value T2, that is, the true/false judgment range (azimuth angles θ41 to θ32), is broader than the range when using the antenna pattern P3 in the first configuration example (azimuth angles θ31 to θ32).

Figure 10B:
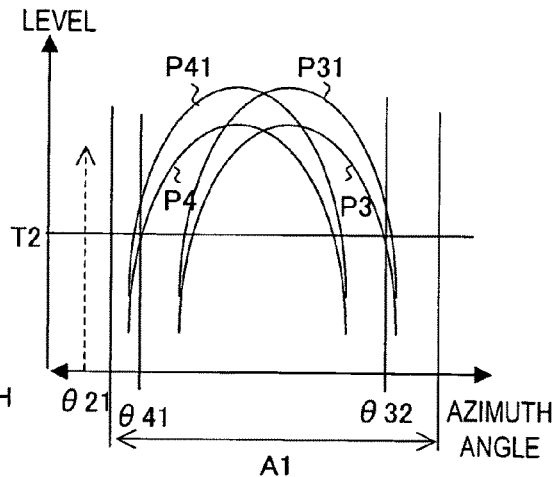

And, as shown in FIG. 10B, even in cases in which the reflection cross-sectional area of the target is large, and the antenna patterns P3 and P4 are displaced upward as with the antenna patterns P31 and P41, by setting the directivity of the composite waves B1 and B2 such that the composite waves of received wave pairs from a target outside the phase wrapping interval A1 do not exceed the threshold value T2, true/false judgment is possible within the range of the phase wrapping interval A1.

Hence even when a target existing at an azimuth angle θ21 outside the phase wrapping interval A1 as shown in FIG. 2B is a large vehicle, and a pair of received waves is received from this target, the level of the composite wave at the azimuth angle θ21 does not exceed the threshold value T2 due to the displacement of antenna patterns P3 and P4 to P31 and P41. Hence erroneous true/false judgments arising from waves received from a target existing at an azimuth angle outside the phase wrapping interval A1 can be prevented.

Figure 10C:
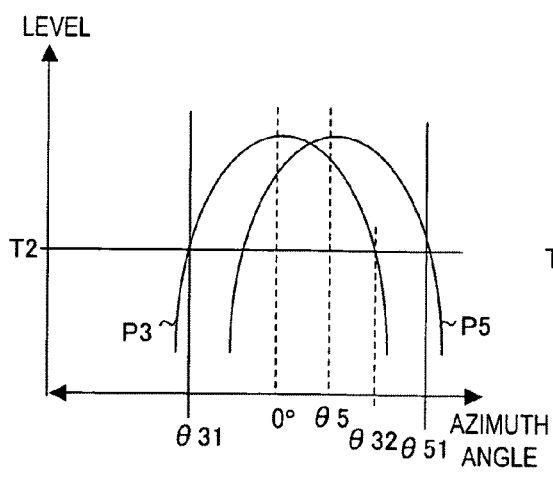

As a modified example of the above, a configuration is also possible in which the phase shifter 30 is connected to the antenna 11 rather than to the antenna 13, and the phase of the received wave W11 is delayed instead of the received wave W13. In this case, an antenna pattern P5 for a composite wave B2 is obtained as shown in FIG. 10C. That is, the antenna pattern P3 is parallel-displaced so as to have directivity at azimuth angle θ5 on the side opposite azimuth angle θ4, contrary to the case of FIG. 10A. And, in the antenna pattern P3 or P5, the range of azimuth angles such that a reception level equal to or greater than the threshold value T2 is obtained, that is, the true/false judgment range (azimuth angles θ31 to θ51), is broader than the range when using the antenna pattern P3 in the first configuration example (azimuth angles θ31 to θ32).

Figure 10D:
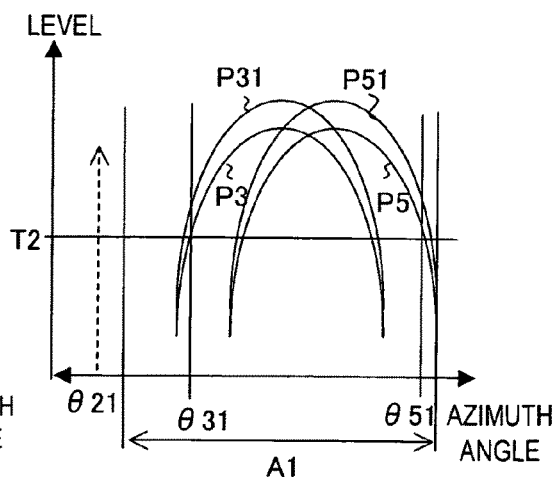

Further, as shown in FIG. 10D, even when the reflection cross-sectional area of the target is large and the antenna patterns P3 and P5 are displaced upward to become the antenna patterns P31 and P51 respectively, by setting the directivity of the composite waves B1 and B2 such that the composite waves of the received wave pair from a target outside the phase wrapping interval A1 does not exceed the threshold value T2, accurate true/false judgment is possible.

Figure 11:
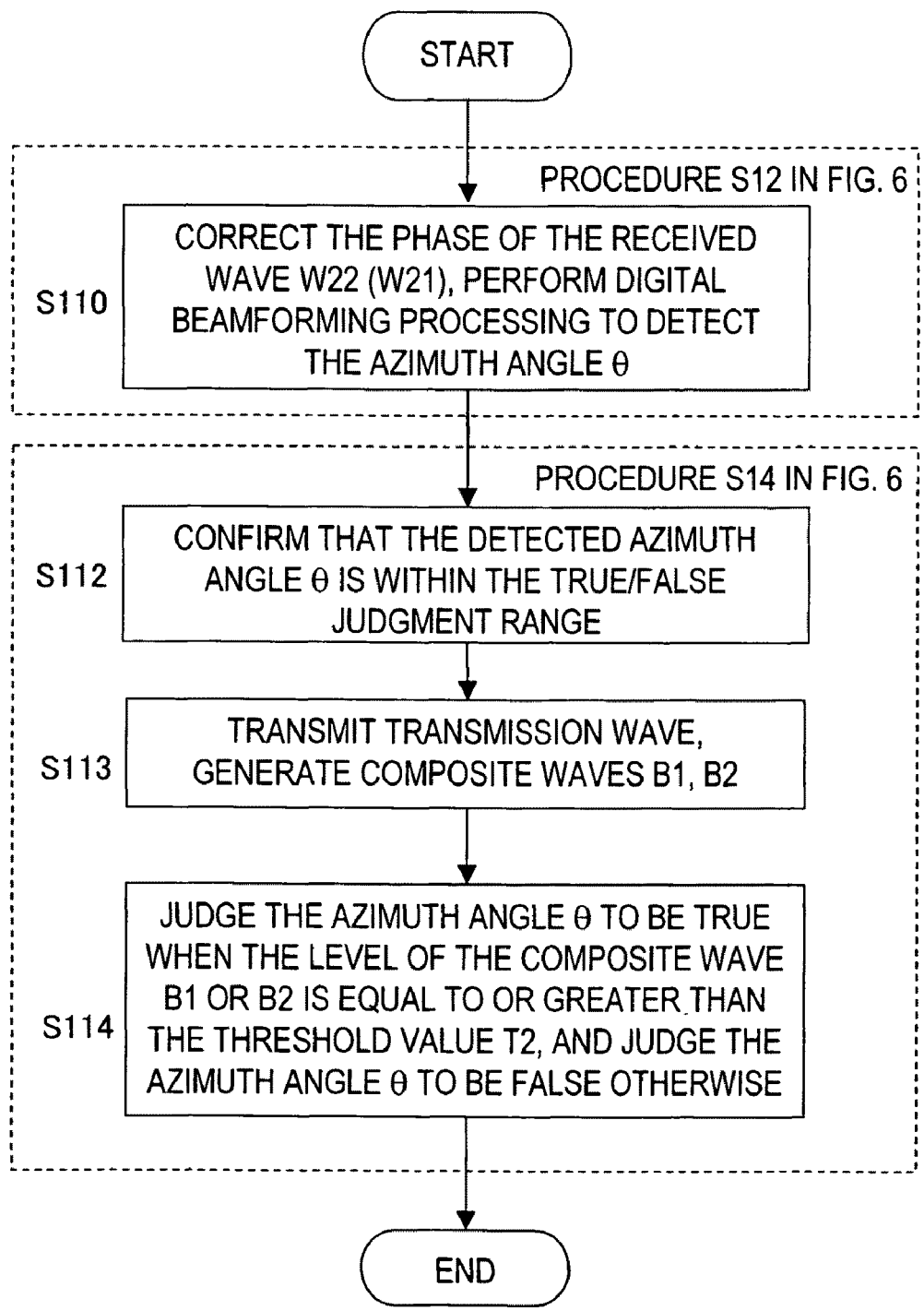
FIG. 11 is a flowchart explaining the procedure of detection of a target azimuth angle, and the procedure for true/false judgment of a detected azimuth angle, in the second configuration example.

FIG. 11 is a flowchart explaining the procedure of detection of a target azimuth angle, and the procedure for true/false judgment of a detected azimuth angle, in the second configuration example. The procedure S110 corresponds to the procedure S12 in FIG. 6, and the procedures S112 to S114 correspond to the procedure S14 in FIG. 6.

First, the signal processing portion 24 corrects the phase delay, due to the phase shifter 30, in the received wave W22 (in the modified example, the received wave W21 from the antenna 13 (in the modified example, the antenna 11), and performs digital beamforming processing of the received waves W21, W22, W23 of the respective antennas 11, 12, 13. Then, the directivities of the received waves are made to coincide with the received wave arrival direction, and the azimuth angle corresponding to the received wave level peak is detected as the azimuth angle θ of the target (S110).

Next, the signal processing portion 24 judges that the detected azimuth angle θ is within the true/false judgment range (θ41 to θ51) (S112). And, when the detected azimuth angle θ is within the true/false judgment range, the signal processing portion 24 instructs the transmission/reception circuit 22 to transmit a transmission wave, and instructs the composite wave generation portion 26, via the transmission/reception circuit 22, to combine the pairs of waves received by the antenna pair 11, 12 and by the antenna pair 12, 13 (S113).

And, the signal processing portion 24 judges whether the level of the composite wave B1 or B2 is equal to or greater than the threshold value T2 (S114). If the level is equal to or greater than the threshold value T2, the detected azimuth angle θ can be inferred to have been detected from waves received from a target actually existing within the true/false judgment range, and so the detection result is judged to be true. On the other hand, if a composite wave level is less than the threshold value T2, the detected azimuth angle θ can be inferred to be erroneously detected due to waves received from a target existing outside the phase wrapping interval A1, and so is judged to be false.

Figures 12A, 12B:
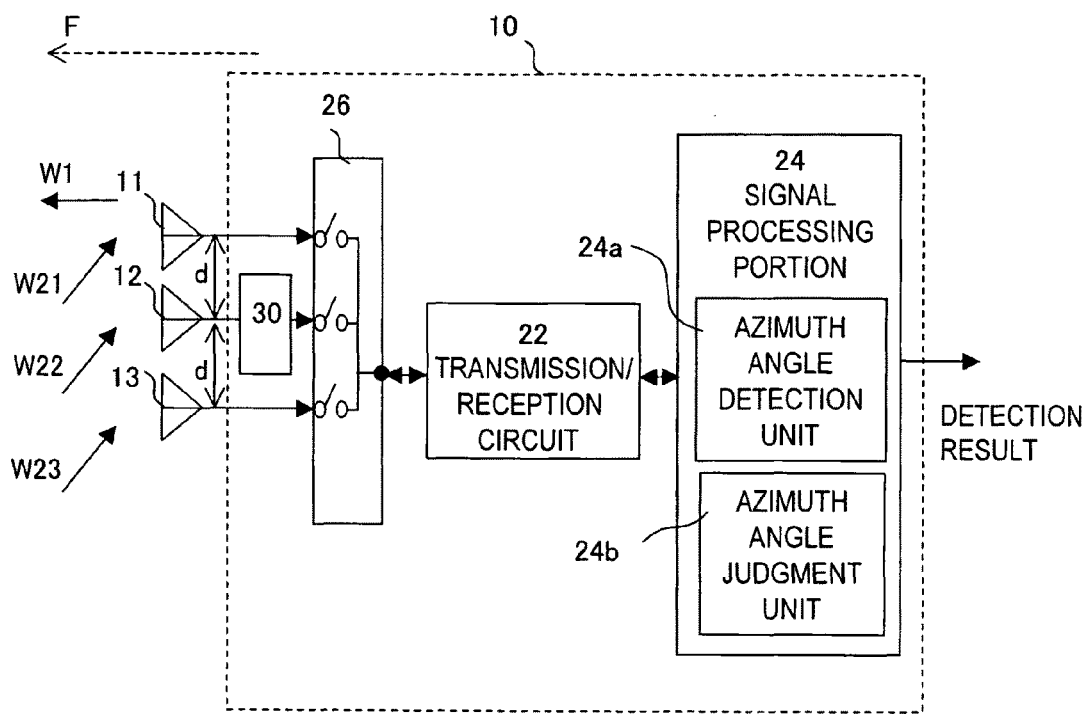
FIG. 12A and FIG. 12B explain a third configuration example of a radar device 10 of this embodiment.

FIG. 12A and FIG. 12B explain a third configuration example of a radar device 10 of this embodiment. In the third configuration example, as shown in FIG. 12A, the wave W22 received by the antenna 12 is input to the phase shifter 30, the phase is delayed, and the result is input to the composite wave generation portion 26.

The composite wave generation portion 26 switches the switches to connect two among the antennas 11, 12, 13 according to the table of FIG. 12B, combines the pairs of waves received by the connected antennas, and generates composite waves. That is, the composite wave generation portion 26 first turns on the switches for the antennas 11 and 12, to combine the pair of received waves W21 and W22 and generate a composite wave B11. Next, the composite wave generation portion 26 turns on the switches for the antennas 12 and 13, to combine the pair of received waves W22 and W23 and generate a composite wave B12.

Figure 13A:
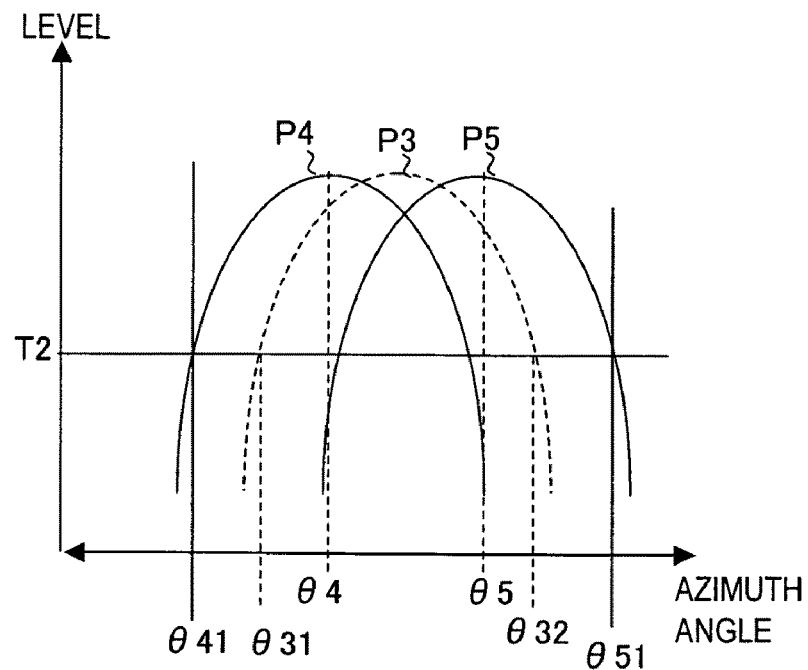
FIG. 13A and FIG. 13B show the antenna patterns for the composite waves in the third configuration example.

As a result, the antenna patterns for the composite waves B11 and B12 become like the antenna pattern P4 or P5 shown in FIG. 13A. That is, the antenna patterns P4 and P5 result from moving the directivity of the antenna pattern P3 to the azimuth angle θ4 or θ5, as shown in FIG. 10A and FIG. 10C.

In such antenna patterns P4 and P5, the range of azimuth angles at which a reception level equal to or greater than the threshold value T2 is obtained, that is, the true/false judgment range (azimuth angles θ41 to θ51), is further broadened compared with the range when using the antenna patterns P3 and P4 in the second configuration example (azimuth angles θ41 to θ32), or compared with the range when using the antenna patterns P3 and P5 (azimuth angles θ31 to θ51).

Figure 13B:
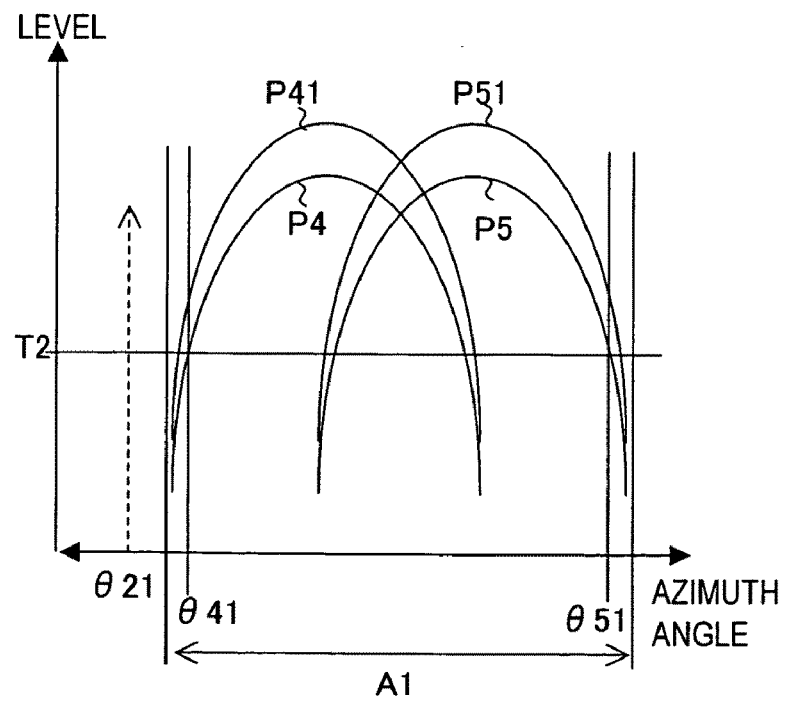

And as shown in FIG. 13B, even when the reflection cross-sectional area of the target is large and the antenna patterns P4 and P5 are displaced upward as with the respective antenna patterns P41 and P51, by setting the directivity of the composite waves B1 and B2 such that the composite wave of a pair of received waves from a target outside the phase wrapping interval A1 does not exceed the threshold value T2, accurate true/false judgments can be performed within the range of the phase wrapping interval A1.

Hence as shown in FIG. 2B, even when a target existing at azimuth angle $\theta 21$ outside the phase wrapping interval A1 is a large vehicle, and a pair of received waves is received from this target, the level of a composite wave at the azimuth angle $\theta 21$ is never equal to or greater than the threshold value T2 due to displacement of the antenna patterns P4 and P5 to P41 and P51. Hence erroneous true/false judgments arising from waves received from a target existing at an azimuth angle outside the phase wrapping interval A1 can be prevented.

Figure 14:
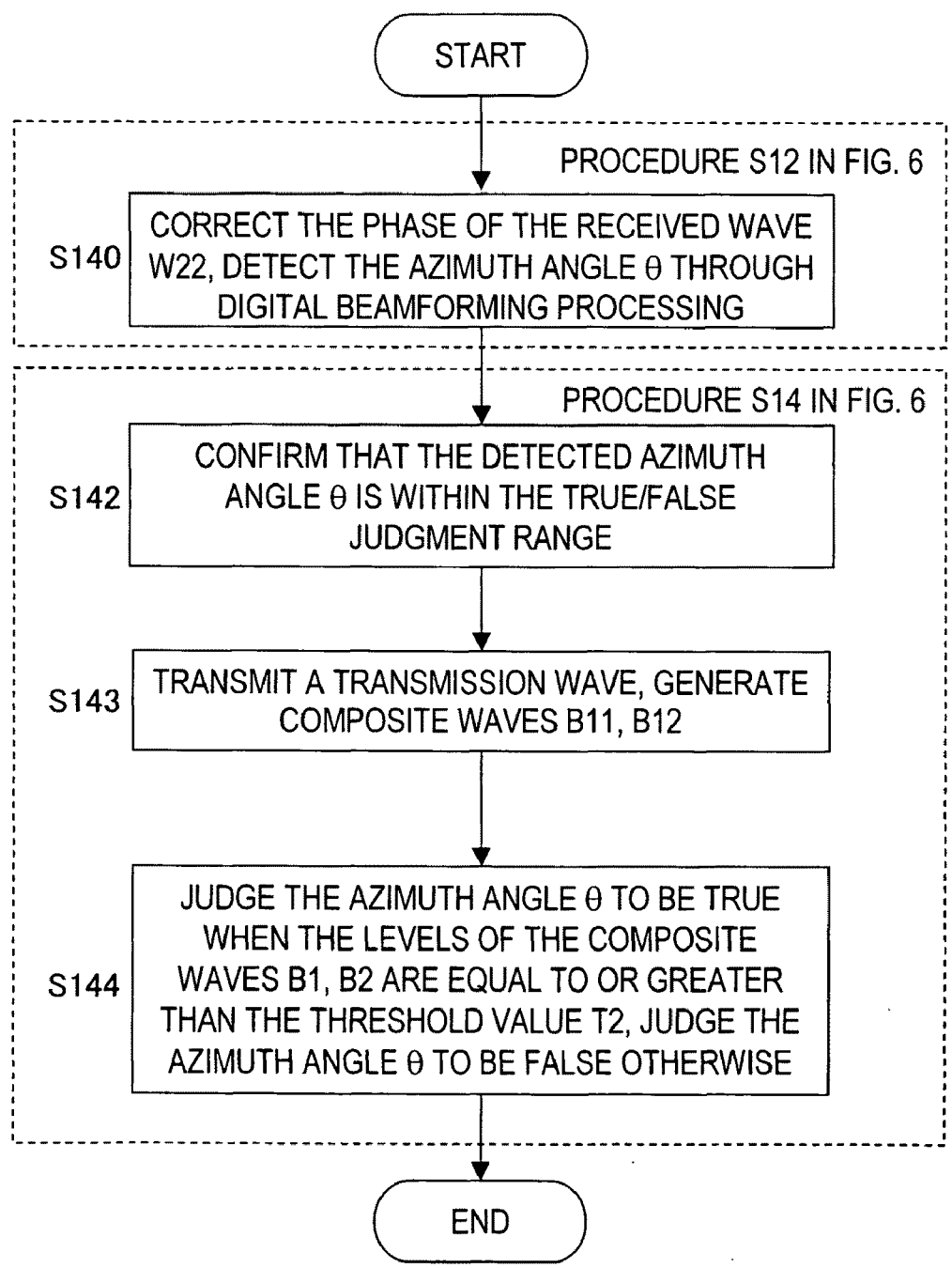
FIG. 14 is a flowchart explaining the procedure for detection of a target azimuth angle, and the procedure for true/false judgment of a detected azimuth, in the third configuration example.

FIG. 14 is a flowchart explaining the procedure for detection of a target azimuth angle, and the procedure for true/false judgment of a detected azimuth, in the third configuration example. The procedure S140 corresponds to the procedure S12 in FIG. 6, and the procedures S112 to S114 correspond to the procedure S14 in FIG. 6.

First, the signal processing portion 24 corrects the phase delay, due to the phase shifter 30, in the received wave W22 received by the antenna 12, and performs digital beamforming processing of the received waves W21, W22, W23 of the respective antennas 11, 12, 13. Then, the directivities of the received waves are made to coincide with the received wave arrival direction, and the azimuth angle corresponding to the received wave level peak is detected as the azimuth angle $\theta$ of the target (S140).

Next, the signal processing portion 24 judges that the detected azimuth angle $\theta$ is within the true/false judgment range ($\theta 41$ to $\theta 51$) (S142). And, when the detected azimuth angle $\theta$ is within the true/false judgment range, the signal processing portion 24 instructs the transmission/reception circuit 22 to transmit a transmission wave, and instructs the composite wave generation portion 26, via the transmission/reception circuit 22, to combine the pairs of waves received by the antenna pair 11, 12 and by the antenna pair 12, 13 (S143).

And, the signal processing portion 24 judges whether the level of the composite wave B11 or B12 is equal to or greater than the threshold value T2 (S144). If the level is equal to or greater than the threshold value T2, the detected azimuth angle $\theta$ can be inferred to have been detected from waves received from a target actually existing within the true/false judgment range, and so the detection result is judged to be true. On the other hand, if a composite wave level is less than the threshold value T2, the detected azimuth angle $\theta$ can be inferred to be erroneously detected due to waves received from a target existing outside the phase wrapping interval A1, and so is judged to be false.

FIG. 15A to FIG. 15C explain a fourth configuration example of a radar device 10 of this embodiment. Portions differing from the first configuration example are explained. As shown in FIG. 15A, the radar device 10 further has, in addition to the first configuration example, antennas 13 and 14. And, in the fourth configuration example the antenna 13 is positioned at a distance $2d$ from the antenna 12, and the antenna 14 is positioned at a distance $2d$ from the antenna 13.

By means of such a configuration, the radar device 10 uses waves received by the antennas 11, 12, 13 and 14 (which are respectively the received waves W21, W22, W23 and W24) to perform digital beamforming processing, to detect the azimuth angle $\theta$ of a target.

At this time, the antennas 12 and 13 are separated by a distance $2d$, so that as indicated in the matrix of FIG. 15B, when it is assumed that the antenna 11 is in the position of antenna 12, the same advantageous result is obtained as when a received wave is received by a virtual antenna 15 (shown by a dashed line) at a position separated by $2d$ from the antenna 11 (column C1). The antennas 12 and 14 are separated by a distance $4d$. When the antenna 11 is assumed to be at the position of antenna 12, the same advantageous result is obtained as when a received wave is received by a virtual antenna 16 (shown by a dashed line) at a position separated by $4d$ from the antenna 11 (column C2).

Similarly, applying the positional relationship of antennas 12, 13 and 14 with reference to antenna 11 to a case in which the antenna 11 is assumed to be at the position of the antenna 14, virtual antennas 17, 19, 21 (all shown by dashed lines) are obtained (columns C3, C4, C5). And, applying the positional relationship of antennas 12 and 13 to a case in which the antenna 12 is assumed to be at the position of the antenna 14, the virtual antenna 18 (shown by a dashed line) is obtained (column C6), and applying the positional relationship of antennas 13 and 14 to a case in which the antenna 13 is assumed to be at the position of the antenna 14, the virtual antenna 20 (shown by a dashed line) is obtained (column C7).

By thus positioning a total of four antennas in the space of six antennas, a combination of received waves which is the same as when a total of eleven antennas are positioned at equal distances d is obtained.

The signal processing portion 24 performs digital beamforming processing of the received waves, and detects the azimuth angle $\theta$ of a target. By this means, the directivities of a greater number of received waves can be superposed, and the precision of detection of azimuth angles $\theta$ can be improved.

In the fourth configuration example, waves W23 received by the antenna 13 are input to the phase shifter 30. The phase shifter 30 delays the phase of the received wave 23 and inputs the result to the composite wave generation portion 26. The composite wave generation portion 26 switches the switches to connect two among the antennas 11, 12, 13, 14 according to the table of FIG. 15C. Then, the composite wave generation portion 26 combines the pair of received waves from the connected antennas, and generates a composite wave. That is, the composite wave generation portion 26 first turns on the switches for the antennas 11 and 12, to combine the pair of received waves W21 and W22 and generate a composite wave B3. Next, the composite wave generation portion 26 first turns on the switches for the antennas 12 and 13, to combine the pair of received waves W22 and W23 and generate a composite wave B6. And, the composite wave generation portion 26 first turns on the switches for the antennas 13 and 14, to combine the pair of received waves W23 and W24 and generate a composite wave B7.

Figure 16A:
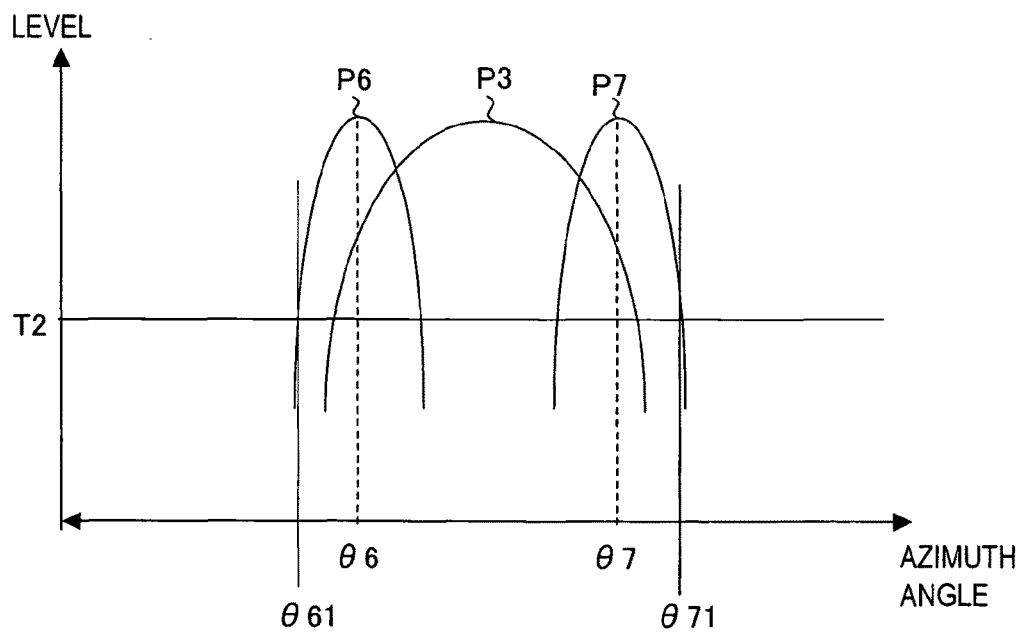
FIG. 16A and FIG. 16B show the antenna patterns of the composite waves in the fourth configuration example.
Figure 16B:
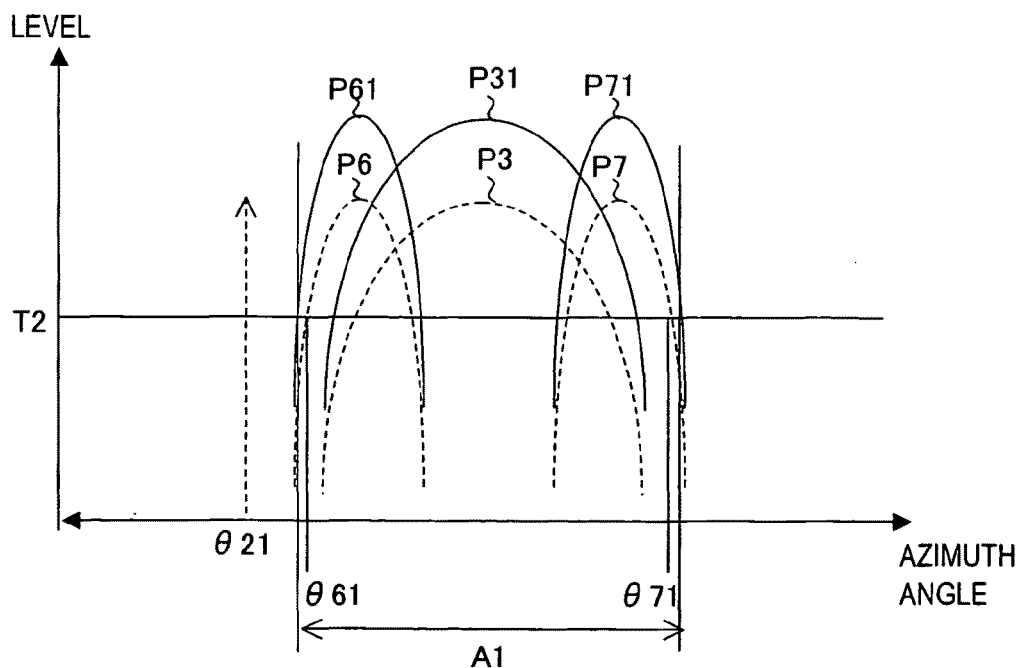

As a result, the antenna patterns of the composite waves B3, B4 and B5 are as shown in FIG. 16A and FIG. 16B. As shown in FIG. 16A, when the antennas 11 and 12 are connected by the switches, the composite wave B3 of the pair of received waves W21 and W22 forms the antenna pattern P3, also shown in FIG. 7A.

Next, the antenna pattern of the composite wave B6 generated from the received waves W22 and W23 is explained. Here, the antennas 12 and 13 are separated by a distance $2d$ which is larger than the distance d between the antennas 11 and 12. Hence the amount of change in the phase difference between the pair of received waves W22, W23 with the amount of displacement of the azimuth angle is still greater than for the composite wave B3, so that the antenna pattern for the composite wave B6 is still stepper than the antenna pattern P3. And, the phase of the wave W23 received from the antenna 13 is delayed, so that an antenna pattern P6 is formed having directivity at the azimuth angle θ6, shifted from the azimuth angle 0°. Hence in this case, the phase shifter 30 corresponds to the "directivity control unit".

Similarly, when the composite wave B7 is generated the phase of the wave W23 received by the antenna 13 is delayed, and so an antenna pattern P7 is generated having directivity at azimuth angle θ7, shifted from azimuth angle 0°. The antenna patterns P6 and P7 are both generated from the waves W23 and W24 received by the antennas 13 and 14, and so have the same shape.

By broadening the widths of the azimuth angles θ6 and θ7 indicating the directivities of the antenna patterns P6 and P7, the range of azimuth angles in which the reception level is equal to or greater than the threshold value T2 for the antenna patterns P3 and P6 or P7, that is, the true/false judgment range (azimuth angles θ61 to θ71), can be further broadened compared with the third configuration example.

And, as shown in FIG. 16B, even when the reflection cross-sectional area of the target is large and the antenna patterns P3, P6, P7 are displaced upward as with the antenna patterns P31, P61, P71 respectively, by setting the directivities of the composite waves B6 and B7 such that the composite wave of a pair of waves received from a target outside the phase wrapping interval A1 does not exceed the threshold value T2, true/false judgments can be performed within the range of the phase wrapping interval A1.

Hence as shown in FIG. 2B, even when a target existing at azimuth angle θ21 outside the phase wrapping interval A1 is a large vehicle, and received waves are received from this target, the level of a composite wave at azimuth angle θ21 never exceeds the threshold value T2 due to displacement of the antenna patterns P3, P6, P7 to P31, P61, P71. Hence erroneous true/false judgments arising from waves received from a target existing at an azimuth angle outside the phase wrapping interval A1 can be prevented.

In the fourth configuration example, by making the antenna patterns P6 and P7 even steeper than the antenna patterns P4 and P5 of the third configuration example, possibility that the level of a composite wave obtained from a target at an azimuth angle outside the phase wrapping interval A1 is equal to or greater than the threshold value T2 due to displacement of the antenna patterns P6 and P7 to P61 and P71 can be further reduced compared with the second configuration example.

Figure 17:
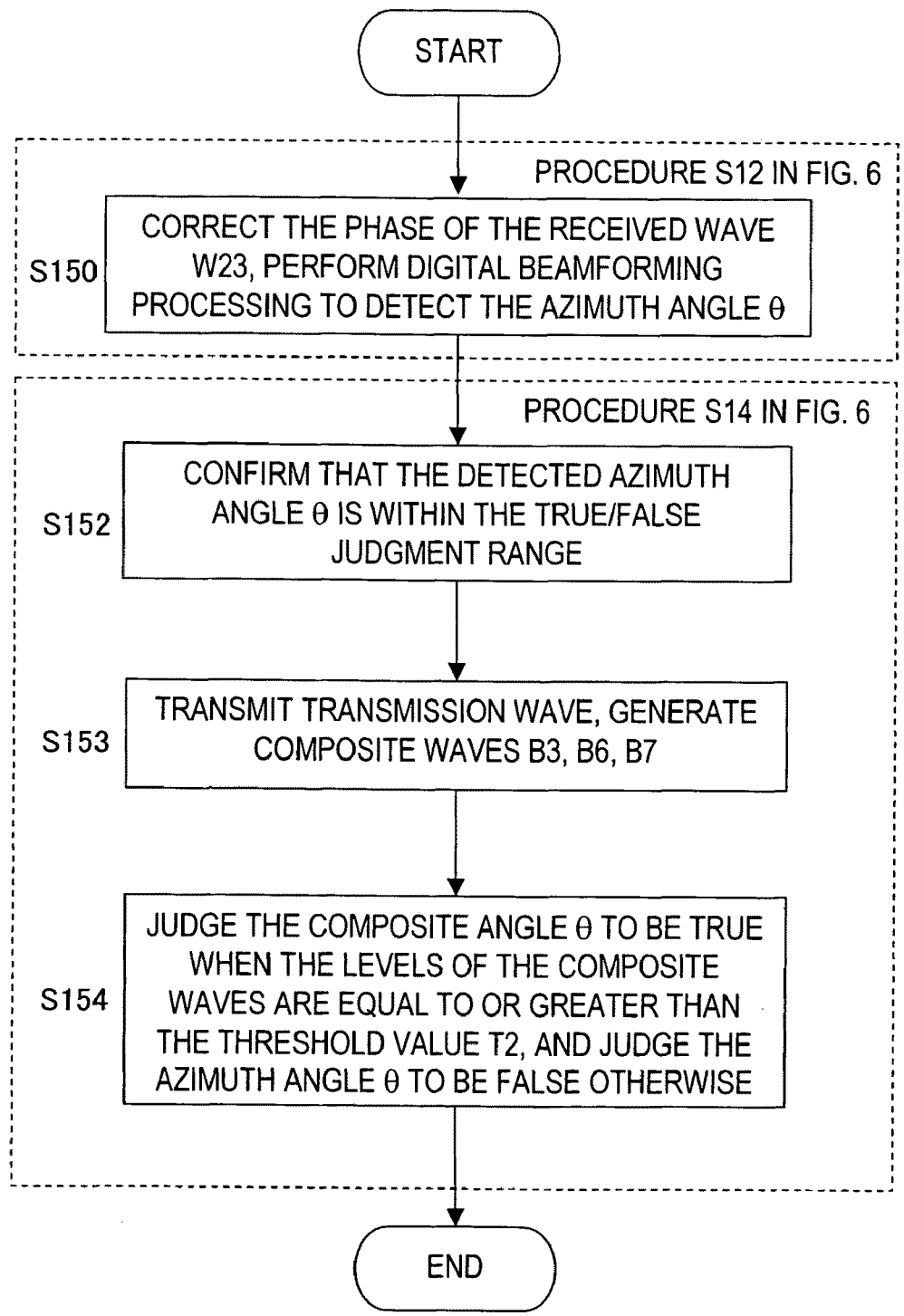
FIG. 17 is a flowchart explaining the procedure for detection of a target azimuth angle and the procedure for true/false judgment of a detected azimuth angle in the fourth configuration example.

FIG. 17 is a flowchart explaining the procedure for detection of a target azimuth angle and the procedure for true/false judgment of a detected azimuth angle in the fourth configuration example. The procedure S150 corresponds to the procedure S12 in FIG. 6, and the procedures S152 and S154 correspond to the procedure S14 in FIG. 6.

First, the signal processing portion 24 corrects the phase delay, due to the phase shifter 30, in the received wave W23 received by the antenna 13, and performs digital beamforming processing of the waves received by the antennas 11, 12, 13 and 14. Then, the directivities of the received waves are made to coincide with the received wave arrival direction, and the azimuth angle corresponding to the received wave level peak is detected as the azimuth angle θ of the target (S150).

Next, the signal processing portion 24 judges that the detected azimuth angle θ is within the true/false judgment range (θ61 to θ71) (S152). And, when the detected azimuth angle θ is within the true/false judgment range, the signal processing portion 24 instructs the transmission/reception circuit 22 to transmit a transmission wave, and instructs the composite wave generation portion 26, via the transmission/reception circuit 22, to combine the waves received by the antennas 11, 12, 13, and 14 (S153).

And, the signal processing portion 24 judges whether the levels of the composite waves B3, B4, B5 are equal to or greater than the threshold value T2 (S154). If the levels are equal to or greater than the threshold value T2, the detected azimuth angle θ can be judged to have been detected from waves received from a target actually existing within the true/false judgment range, and so the detection result is judged to be true. On the other hand, if a composite wave level is less than the threshold value T2, the detected azimuth angle θ can be judged to be erroneously detected due to waves received from a target existing outside the phase wrapping interval A1, and so is judged to be false.

In the above-described examples, explanations were given for examples of a vehicle radar device which monitors the forward direction of the vehicle, but the direction is not limited to the vehicle forward direction, and the radar device may monitor the rear direction or a side direction. Also, if the device is an electronic scanning type radar device in which the level of received waves changes with the reflection cross-sectional area of the target, then the embodiment can be applied in equipment other than on-vehicle radar.

As described above, according to this embodiment, composite waves are used for which the amount of change in level with the change in azimuth angle is large, and which have steep antenna patterns, and true/false judgments are performed in which the azimuth angle is judged to be true when the level of a composite wave at the detected azimuth angle is equal to or greater than a threshold value, and the azimuth angle is judged to be false when the level is less than the threshold value. Hence even when the reflection cross-sectional area of a target is large, and the level of the composite wave is displaced upward, the composite wave of waves received from a target outside the phase wrapping interval never exceeds the threshold value for true/false judgment. Hence an azimuth angle which has been erroneously detected due to phase wrapping is never judged to be true. Consequently, true/false judgments of detected azimuth angles can be performed accurately.

Here, the relation between the level P1 of waves received singly by the antennas 11 and 12 and the level P3 of the composite wave in the first configuration example, shown in FIG. 5 and in FIG. 7A and FIG. 7B, is explained. The level P1 of waves received singly by the antennas 11 and 12 is represented by the directivity P1(θ) for an azimuth angle θ, and the level P3 of the composite wave of the antenna 11 and antenna 12 is represented by the directivity P3(θ) for an azimuth angle θ, and the phase difference between the waves received by the antennas 11 and 12 corresponding to an azimuth angle θ is φ. Then, the directivity P3(θ) can be found from the directivity P1(θ) using the following expression.

$$P3(\theta) = P1(\theta) \times \sqrt{((1+\cos\phi)2 + (\sin\phi)2)} \quad [E1]$$

where φ=d×sin θ×2π/λ (d: distance between antennas 11 and 12, λ: wavelength of received waves)

As a modified example of the fourth configuration example shown in FIG. 15A to FIG. 15C, a configuration may be employed in which the antennas 11 to 14 are used for both transmission and reception, and when transmission signals are transmitted in sequence with time division from the antennas 11 to 14, the received waves are received by the antennas 11 to 14.

In this case, by changing in sequence the positions of antennas transmitting radar waves, the round-trip path length from each receiving antenna to the target object when radar waves are transmitted from different antennas is different, and so waves with different phases are obtained at each receiving antenna. As a result, the positioning of each receiving antenna when the transmitting antenna is taken as reference is equivalent to a case in which eleven receiving antennas are positioned at an equal distance d.

That is, by positioning a total of four antennas in the space of six antennas, the same combination of received waves is obtained as when a total of eleven antennas are positioned at an equal distance d. And, when transmission signals are transmitted in sequence with time division from the antennas 11 to 14, the signal processing portion 24 performs digital beamforming processing of combinations of the received waves received by the antennas 11 to 14, and detects the azimuth angle θ of the target. By this means, a greater number of received wave directivities can be superposed, and the precision of detection of the azimuth angle θ can be improved.

Further, in the above-described first to fourth configuration examples, the signal processing portion 24 inputs switching instruction signals to switch receiving antennas to the composite wave generation portion 26 via the transmission/reception circuit 22; but a configuration may be employed in which the switching instruction signals are input directly to the composite wave generation portion 26, without passing through the transmission/reception circuit 22.

What is claimed is:

1. A radar device, which transmits radar waves in a reference direction, receives the radar waves reflected by a target as received waves, and detects an azimuth angle of the target relative to the reference direction, comprising:
    an azimuth angle detection unit configured to detect the azimuth angle based on a phase difference between a first pair of received waves received by a first pair of antennas separated by a prescribed distance;
    a composite wave generation unit configured to combine the first pair of received waves and to generate a first composite wave; and
    an azimuth angle judgment unit configured to judge that (1) when an amplitude level of the first composite wave at a detected azimuth angle detected by the azimuth angle detection unit is equal to or greater than a first threshold value, the target is present at the detected azimuth angle, and (2) when the amplitude level of the first composite wave at the detected azimuth angle is lower than the first threshold value, the target is not present at the detected azimuth angle.

2. The radar device of claim 1, further comprising:
    a phase shifter configured to shift the phase of either received wave among the first pair of received waves, wherein
    the composite wave generation unit generates a second composite wave from a second pair of received waves including a received wave the phase of which has been shifted by the phase shifter, and
    the azimuth angle judgment unit judges that (1) when the amplitude level of either of the first or second composite waves at the detected azimuth angle is equal to or greater than a second threshold value, the target is present at the detected azimuth angle, and (2) when the amplitude level of either of the first or second composite waves at the detected azimuth angle is lower than the second threshold value, the target is not present at the detected azimuth angle.

3. The radar device of claim 1, further comprising:
    a phase shifter configured to shift the phase of either received wave among a third pair of received waves that are received by a second pair of antennas separated by a distance greater than the prescribed distance of the first pair of antennas, wherein
    the composite wave generation unit generates, from a fourth pair of received waves including a received wave the phase of which has been shifted by the phase shifter, a third composite wave in which a peak of an amplitude level of the third composite wave is formed at an edge portion of an azimuth angle range in which the amplitude level of the first composite wave is distributed, and
    the azimuth angle judgment unit judges that (1) when the amplitude level of either of the first or third composite waves at the detected azimuth angle is equal to or greater than a second threshold value, the target is present at the detected azimuth angle, and (2) when the amplitude level of either of the first or third composite waves at the detected azimuth angle is lower than the second threshold value, the target is not present at the detected azimuth angle.

4. An azimuth angle detection method for detecting an azimuth angle of a target relative to a reference direction by a radar device which transmits radar waves in the reference direction, and receives the radar waves reflected by the target as received waves, comprising:
    detecting the azimuth angle based on a phase difference between a pair of received waves received by a pair of antennas separated by a prescribed distance;
    generating a composite wave of the pair of received waves; and
    performing a judgment that (1) when an amplitude level of the composite wave at a detected azimuth angle detected in the detection step is equal to or greater than a threshold value, the target is present at the detected azimuth angle, and (2) when the amplitude level of the first composite wave at the detected azimuth angle is lower than the threshold value, the target is not present at the detected azimuth angle.

* * * * *